(12) United States Patent
Cai et al.

(10) Patent No.: US 11,764,888 B2
(45) Date of Patent: Sep. 19, 2023

(54) BEAM CHARACTERIZATION

(71) Applicant: QUALCOMM Incorporated, San Diego, CA (US)

(72) Inventors: Mingming Cai, San Jose, CA (US); Raghu Narayan Challa, San Diego, CA (US); Revathi Sundara Raghavan, San Diego, CA (US); Michael Burke, Morris Plains, NJ (US); Abhilash Bangalore Ravi, San Diego, CA (US); Mihir Vijay Laghate, San Diego, CA (US); Shrenik Patel, San Diego, CA (US); Sang-June Park, San Diego, CA (US); Mohammad Ali Tassoudji, San Diego, CA (US); Sudarsan Krishnan, San Diego, CA (US); Vasanthan Raghavan, West Windsor Township, NJ (US); Siddharth Kamath, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 16/892,982

(22) Filed: Jun. 4, 2020

(65) Prior Publication Data
US 2020/0389238 A1    Dec. 10, 2020

Related U.S. Application Data

(60) Provisional application No. 62/869,874, filed on Jul. 2, 2019, provisional application No. 62/858,975, filed on Jun. 7, 2019.

(51) Int. Cl.
*H04B 17/364* (2015.01)
*H04B 7/08* (2006.01)
*H04B 7/0413* (2017.01)

(52) U.S. Cl.
CPC ........ *H04B 17/364* (2015.01); *H04B 7/0814* (2013.01); *H04B 7/0822* (2013.01); *H04B 7/0413* (2013.01)

(58) Field of Classification Search
CPC .... H04B 7/0695; H04B 7/0874; H04B 7/088; H04B 7/06; H04B 7/0456; H04B 7/0691;
(Continued)

(56) References Cited

U.S. PATENT DOCUMENTS

| 6,417,803 B1 * | 7/2002 | de La Chapelle | G01S 3/20 342/354 |
| 8,792,538 B2 * | 7/2014 | Zhang | H04B 7/0469 710/1 |

(Continued)

FOREIGN PATENT DOCUMENTS

| CN | 201656965 U | * 11/2010 |
| WO | 2018064348 A1 | 4/2018 |

OTHER PUBLICATIONS

International Search Report and Written Opinion—PCT/US2020/036237—ISA/EPO—dated Sep. 25, 2020.
(Continued)

*Primary Examiner* — Sophia Vlahos
(74) *Attorney, Agent, or Firm* — QUALCOMM IP DEPT.; James Hunt Yancey, Jr.

(57) ABSTRACT

Various aspects of the present disclosure generally relate to wireless communication and testing. In some aspects, a device may receive information identifying a mount orientation of a wireless communication device, wherein the mount orientation indicates an orientation of a coordinate system of the wireless communication device relative to a coordinate system of a positioner. The device may capture measurement information at each position of a set of positions of the wireless communication device, wherein the set of positions comprises positions of the wireless communi-
(Continued)

cation device as the wireless communication device is rotated around an axis by the positioner, and wherein the measurement information is captured based at least in part on the mount orientation. The device may provide information identifying the measurement information. Some techniques and apparatuses described herein may use the measurement information to generate a codebook for beam generation. Numerous other aspects are provided.

36 Claims, 11 Drawing Sheets

(58) Field of Classification Search
CPC .. H04B 17/364; H04B 7/0814; H04B 7/0822; H04B 7/0413; H04B 7/0478; H04B 7/0482
See application file for complete search history.

(56) References Cited

U.S. PATENT DOCUMENTS

| | | | |
|---|---|---|---|
| 9,160,433 B2 | 10/2015 | Liu et al. | |
| 9,198,050 B2 | 11/2015 | Hultell et al. | |
| 10,063,291 B1 | 8/2018 | Wei et al. | |
| 10,439,921 B1* | 10/2019 | Dubey | H04W 24/08 |
| 10,833,750 B2* | 11/2020 | Bhamidipati | H04B 7/0456 |
| 2006/0039493 A1 | 2/2006 | Mukkavilli et al. | |
| 2009/0041150 A1 | 2/2009 | Tsai et al. | |
| 2012/0230380 A1 | 9/2012 | Keusgen et al. | |
| 2013/0223487 A1* | 8/2013 | Zhou | H04B 7/0695 375/219 |
| 2015/0282122 A1* | 10/2015 | Kim | H04B 7/0408 370/329 |
| 2016/0359573 A1 | 12/2016 | Pauly et al. | |
| 2017/0111495 A1* | 4/2017 | Yu | H04M 1/72469 |
| 2017/0155439 A1* | 6/2017 | Chang | H01Q 1/246 |
| 2017/0187109 A1 | 6/2017 | Wang et al. | |
| 2018/0329017 A1* | 11/2018 | Morita | G01S 3/38 |
| 2019/0013977 A1* | 1/2019 | Harrison | H04L 5/0048 |
| 2019/0045494 A1 | 2/2019 | Ho et al. | |
| 2019/0058535 A1 | 2/2019 | Karajani et al. | |
| 2019/0222275 A1 | 7/2019 | Mo et al. | |
| 2019/0245608 A1 | 8/2019 | Kakishima et al. | |
| 2020/0124706 A1* | 4/2020 | Buddendick | G01S 13/87 |
| 2020/0209296 A1* | 7/2020 | Kong | H04B 7/0695 |
| 2021/0109145 A1* | 4/2021 | Haustein | G01R 29/10 |

OTHER PUBLICATIONS

Partial International Search Report—PCT/US2020/036237—ISA/EPO—dated Aug. 31, 2020.
European Search Report—EP22188483—Search Authority—Munich—dated Nov. 10, 2022.

* cited by examiner

FIG. 8

BEAM CHARACTERIZATION

CROSS-REFERENCE TO RELATED APPLICATION

This patent application claims priority to Provisional Patent Application No. 62/858,975, filed on Jun. 7, 2019, and to Provisional Patent Application No. 62/869,874, filed on Jul. 2, 2019, both entitled "BEAM CHARACTERIZATION" ("the Priority Applications"). The disclosure of the Priority applications is considered part of and is incorporated by reference in this patent application as if fully set forth below in its entirety and for all applicable purposes.

TECHNICAL FIELD

Aspects of the technology described below generally relate to wireless communication and to techniques and apparatuses for beam characterization. Some techniques and apparatuses described herein enable and provide wireless communication devices and systems configured for efficient radio component usage.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). A wireless communication network may include a number of base stations (BSs) that can support communication for a number of user equipment (UEs). A user equipment (UE) may communicate with a base station (BS) via the downlink and uplink, for example, using beams (e.g., beam pairs, beam sets, and/or the like). The downlink (or forward link) refers to the communication link from the BS to the UE, and the uplink (or reverse link) refers to the communication link from the UE to the BS. New Radio (NR), which may also be referred to as 5G, is a set of enhancements to the LTE mobile standard promulgated by the Third Generation Partnership Project (3GPP). As demand for mobile broadband access continues to increase, there exists a need for further improvements in LTE and NR technologies. These improvements can apply to other multiple access technologies and the telecommunication standards that employ these technologies.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. The purpose of the summary is to present some concepts of one or more aspects of the disclosure in summary form as a prelude to the more detailed description that is presented further below.

Some radio access technologies, such as 5G/NR, may use high-frequency communications, such as millimeter wave (mmWave), to improve throughput. Millimeter wave channels may suffer from high propagation loss. Thus, a wireless communication device (e.g., a UE or base station) may use beamforming to improve channel gain. The wireless communication device may generate a beam set (e.g., one or more beams) to transmit or receive information. The wireless communication device may generate the beam set using a group of antennas, such as an antenna array, an antenna subarray, and/or the like. The beam set may be generated using a codebook that identifies codewords to be used to generate each beam. For example, the wireless communication device may use a codeword corresponding to a particular beam to generate a waveform to be applied to a group of antennas to generate the particular beam. However, the interaction of different antennas, the complexity of the wireless communication device's geometry, and other concerns may complicate the generation of the codebook. Furthermore, the measurement of the wireless communication device's electric field, if performed while a plurality of antennas are active (as opposed to being performed while a single antenna is active), may not provide sufficient granularity of information to enable optimization of the codebook. Still further, different testing systems may use different coordinate systems, thereby complicating determination of measurement information and increasing likelihood of error.

Some techniques and apparatuses described herein provide automated measurement of an electric field of a wireless communication device based at least in part on a mount orientation that identifies a coordinate system of the wireless communication device relative to a coordinate system of the testing chamber. In some aspects, the measurement may be performed at a per-antenna granularity (e.g., in which each antenna is measured in isolation from every other antenna, as opposed to an antenna group granularity in which multiple antennas are concurrently activated for measurement), which improves accuracy and utility of the measurement information for generation of a codebook. Some techniques and apparatuses described herein may generate a codebook for the wireless communication device based at least in part on the measurement information or based at least in part on simulated electric field information (e.g., information identifying a simulated electric field of the wireless communication device). The generation of the codebook using the measurement information (e.g., at the per-antenna granularity) may result in a more efficient codebook that achieves improved beamforming gain and more accurate beam generation, relative to a codebook generated using antenna group granularity measurement information. Some techniques and apparatuses described herein may perform beam verification, wherein an observed performance of a beam or beam set is compared to an expected performance using the codebook. In this way, techniques and apparatuses described herein improve performance of beamforming for wireless communication devices, reduce inaccuracy and nonuniformity in measurement and codebook generation, and improve radio frequency performance of wireless communication devices.

In some aspects, a method of wireless communication, performed by a device, may include receiving information identifying a mount orientation of a wireless communication device. The mount orientation may indicate an orientation of a coordinate system of the wireless communication device relative to a coordinate system of a positioner. The method may also include capturing measurement information at each position of a set of positions of the wireless communication device. The set of positions may include positions of the wireless communication device as the wireless communication device is rotated around an axis by the positioner. The measurement information may be captured based at least in part on the mount orientation. The method may include providing information identifying the measurement information.

In some aspects, a method of wireless communication, performed by a device, may include receiving electric field information regarding a plurality of beams generated by a plurality of antennas of a wireless communication device. The plurality of beams may be generated using a per-antenna measurement procedure. The method may include generating a codebook based at least in part on the electric field information. The codebook may identify codewords corresponding to the plurality of beams. The codebook may identify beam pairs to be used for dual-port communication by the wireless communication device. The method may also include providing information identifying the codebook.

In some aspects, a device for wireless communication may include memory and one or more processors operatively coupled to the memory. The memory and the one or more processors may be configured to receive information identifying a mount orientation of a wireless communication device. The mount orientation may indicate an orientation of a coordinate system of the wireless communication device relative to a coordinate system of a positioner. The memory and the one or more processors may be configured to capture measurement information at each position of a set of positions of the wireless communication device. The set of positions may include positions of the wireless communication device as the wireless communication device is rotated around an axis by the positioner. The measurement information may be captured based at least in part on the mount orientation. The memory and the one or more processors may be configured to and provide information identifying the measurement information.

In some aspects, a device for wireless communication may include memory and one or more processors operatively coupled to the memory. The memory and the one or more processors may be configured to receive electric field information regarding a plurality of beams generated by a plurality of antennas of a wireless communication device. The plurality of beams may be generated using a per-antenna measurement procedure. The memory and the one or more processors may be configured to generate a codebook based at least in part on the electric field information. The codebook may identify codewords corresponding to the plurality of beams and beam pairs to be used for dual-port communication by the wireless communication device. The memory and the one or more processors may be configured to provide information identifying the codebook.

In some aspects, a non-transitory computer-readable medium may store one or more instructions for wireless communication. The one or more instructions, when executed by one or more processors of a device, may cause the one or more processors to receive information identifying a mount orientation of a wireless communication device. The mount orientation may indicate an orientation of a coordinate system of the wireless communication device relative to a coordinate system of a positioner. The one or more instructions, when executed by one or more processors of a device, may cause the one or more processors to capture measurement information at each position of a set of positions of the wireless communication device. The set of positions may comprise positions of the wireless communication device as the wireless communication device is rotated around an axis by the positioner. The measurement information is captured based at least in part on the mount orientation. The one or more instructions, when executed by one or more processors of a device, may cause the one or more processors to provide information identifying the measurement information.

In some aspects, a non-transitory computer-readable medium may store one or more instructions for wireless communication. The one or more instructions, when executed by one or more processors of a device, may cause the one or more processors to receive electric field information regarding a plurality of beams generated by a plurality of antennas of a wireless communication device. The plurality of beams may be generated using a per-antenna measurement procedure. The one or more instructions, when executed by one or more processors of a device, may cause the one or more processors to generate a codebook based at least in part on the electric field information. The codebook may identify codewords corresponding to the plurality of beams and beam pairs to be used for dual-port communication by the wireless communication device. The one or more instructions, when executed by one or more processors of a device, may cause the one or more processors to provide information identifying the codebook.

In some aspects, an apparatus for wireless communication may include means for receiving information identifying a mount orientation of a wireless communication device. The mount orientation may indicate an orientation of a coordinate system of the wireless communication device relative to a coordinate system of a positioner. The apparatus may also include means for capturing measurement information at each position of a set of positions of the wireless communication device. The set of positions may comprise positions of the wireless communication device as the wireless communication device is rotated around an axis by the positioner. The measurement information may be captured based at least in part on the mount orientation. The apparatus may include means for providing information identifying the measurement information.

In some aspects, an apparatus for wireless communication may include means for receiving electric field information regarding a plurality of beams generated by a plurality of antennas of a wireless communication device. The plurality of beams may be generated using a per-antenna measurement procedure. The apparatus may include means for generating a codebook based at least in part on the electric field information. The codebook may identify codewords corresponding to the plurality of beams and beam pairs to be used for dual-port communication by the wireless communication device. The apparatus may include means for providing information identifying the codebook.

In some aspects, a method of wireless communication, performed by a device, may include loading a codebook. The codebook may indicate parameters for beam generation for communication by the UE using a plurality of antennas of the UE. The codebook may be based at least in part on measurement information gathered using a per-antenna measurement procedure. The method may also include generating a plurality of beams based at least in part on the codebook. One or more first antennas of the UE may be active during generation of a beam of the plurality of beams, and one or more second antennas of the UE may not be active during generation of the beam.

In some aspects, a device for wireless communication may include memory and one or more processors operatively coupled to the memory. The memory and the one or more processors may be configured to load a codebook. The codebook may indicate parameters for beam generation for communication by the UE using a plurality of antennas of the UE. The codebook may be based at least in part on measurement information gathered using a per-antenna measurement procedure. The memory and the one or more processors may be configured to generate a plurality of beams based at least in part on the codebook. One or more first antennas of the UE may be active during generation of a beam of the plurality of beams, and one or more second antennas of the UE may not be active during generation of the beam.

In some aspects, a non-transitory computer-readable medium may store one or more instructions for wireless communication. The one or more instructions, when executed by one or more processors of a device, may cause the one or more processors to load a codebook. The codebook may indicate parameters for beam generation for communication by the UE using a plurality of antennas of the UE. The codebook may be based at least in part on measurement information gathered using a per-antenna measurement procedure. The one or more instructions, when executed by one or more processors of a device, may cause the one or more processors to generate a plurality of beams based at least in part on the codebook. One or more first antennas of the UE may be active during generation of a beam of the plurality of beams, and one or more second antennas of the UE may not be active during generation of the beam.

In some aspects, an apparatus for wireless communication may include means for loading a codebook. The codebook may indicate parameters for beam generation for communication by the UE using a plurality of antennas of the UE. The codebook may be based at least in part on measurement information gathered using a per-antenna measurement procedure. The apparatus may include means for generating a plurality of beams based at least in part on the codebook. One or more first antennas of the UE may be active during generation of a beam of the plurality of beams, and one or more second antennas of the UE may not be active during generation of the beam.

Aspects generally include a method, apparatus, system, computer program product, non-transitory computer-readable medium, user equipment, base station, wireless communication device, testing system, device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description is provided herein, with some aspects of the disclosure being illustrated in the appended drawings. However, the appended drawings illustrate only some aspects of this disclosure and are therefore not to be considered limiting of the scope of the disclosure. The same reference numbers in different drawings may identify the same or similar elements.

FIG. 8 is a diagram illustrating an example of hardware information for a device under test, in accordance with various aspects of the present disclosure.

DETAILED DESCRIPTION

Figure 1:
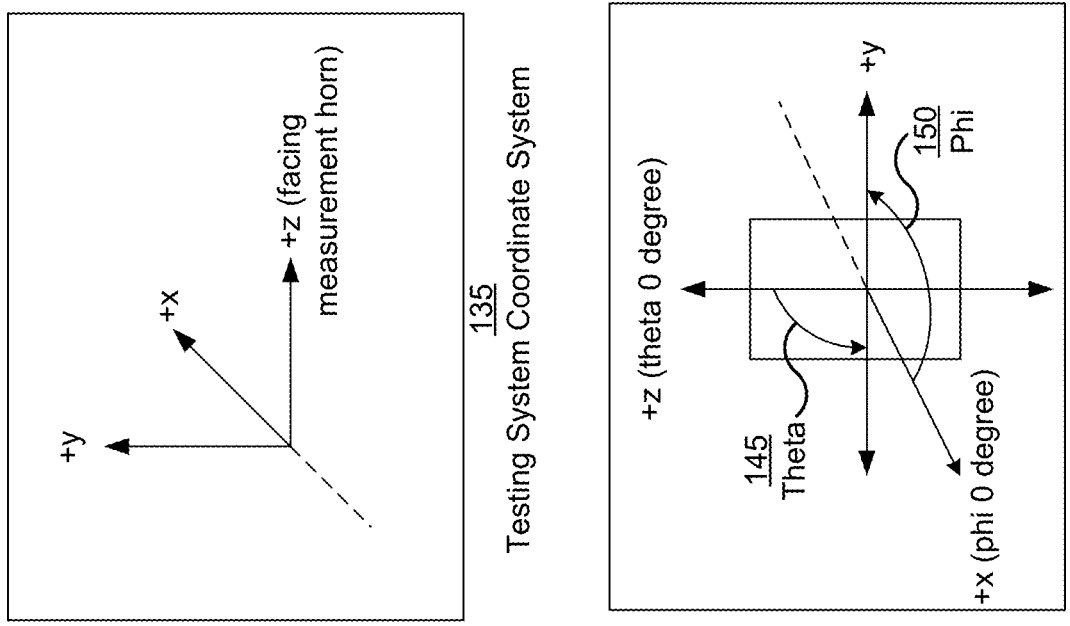
FIG. 1 is a block diagram conceptually illustrating an example of a testing system and coordinate systems for the testing system and a device under test, in accordance with various aspects of the present disclosure.
Figure 1:
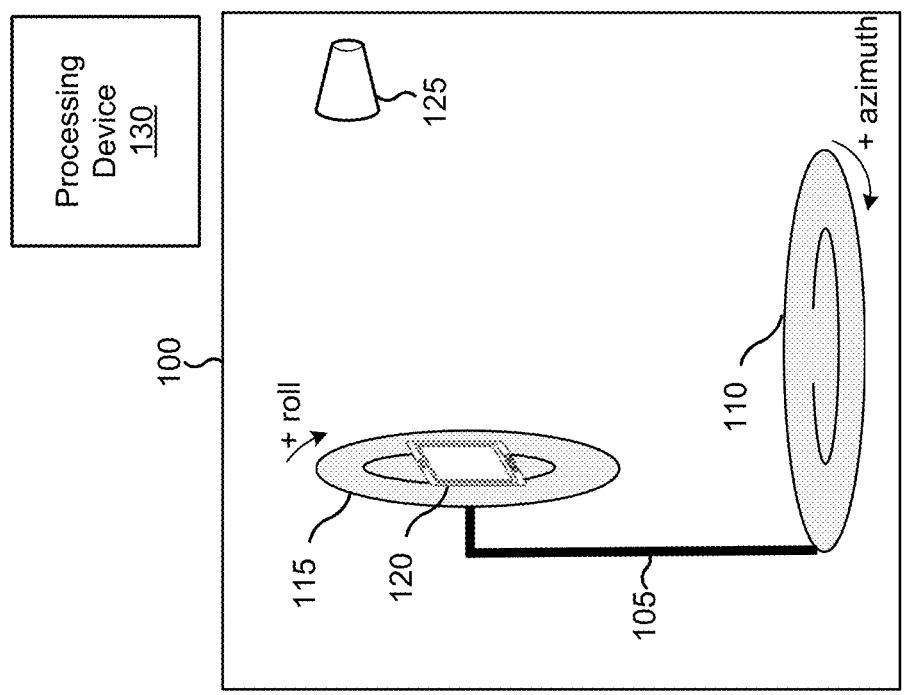

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements" or "features"). These elements may be implemented using hardware, software, or combinations thereof. Whether such elements are implemented as hardware or software depends upon the particular application and design constraints imposed on the overall system.

While some aspects may be described herein using terminology commonly associated with 3G and/or 4G wireless technologies, aspects of the present disclosure can be applied in other generation-based communication systems, such as 5G and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, and/or the like). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including one or more antennas, radio frequency chains, power amplifiers, modulators, buffers, processors, interleavers, adders/summers, and/or the like). It is intended that innovations described herein may be practiced in a wide variety of devices, chip-level components, systems, distributed arrangements, end-user devices, etc. of varying sizes, shapes, and constitution.

The electromagnetic spectrum is often subdivided, based on frequency/wavelength, into various classes, bands, channels, etc. In 5G NR, two initial operating bands have been identified as frequency range designations FR1 (410 MHz -7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, or may be within the EHF band.

FIG. 1 is a block diagram conceptually illustrating an example of a testing system 100 and an adjacent beam determination using the testing system 100, in accordance with various aspects of the present disclosure. As shown, the testing system 100 includes a positioner 105 with a lower platter 110 and an upper platter 115 to which a UE 120 (e.g., a wireless communication device) is mounted, a measurement horn 125, and a processing device 130. In some aspects, the processing device 130 may be separate from the testing system 100.

The testing system 100 may include, for example, a testing chamber (e.g., a near-field testing chamber or another type of testing chamber), an antenna test range, a compact antenna test range (CATR), a vector network analyzer (VNA), an amplitude phase versus time (APvT) testing system, and/or the like. The testing system 100 may perform testing of an electric field generated by the UE 120. For example, the measurement horn 125 may determine amplitude measurement values, phase measurement values, and/or the like, regarding the electric field. The measurement horn 125 may include a device capable of determining an electric field measurement, such as an antenna, a group of antennas, and/or the like. The measurement horn 125 may be capable of measurement at a single polarity or at multiple polarities.

The positioner 105 may position the UE 120 by rotating the UE 120 around a first axis (e.g., by rotating the lower platter 110, thereby rotating the UE 120 around a longitudinal axis of the UE 120) and/or around a second axis (e.g., by rotating the upper platter 115, thereby rotating the UE 120 around an axis normal to the plane of the UE 120). By rotating the UE 120 to a variety of positions and/or by mounting the UE 120 in a variety of orientations, a complete measurement of the electric field generated by the UE 120 may be achieved. This may provide information regarding performance of beams of the UE 120, coverage areas of the beams, coverage holes of the beams, and/or the like.

The UE 120, also referred to herein as a wireless communication device or a device under test (DUT), may communicate using beams, such as transmit beams and receive beams. A beam may be generated using a spatial filter applied to an antenna group (e.g., a set of antennas, an antenna array, an antenna subarray, and/or the like) to transmit a signal in a particular direction (using a transmit beam) or receive a signal from a particular direction (using a receive beam). Beams may improve radio performance (e.g., beamforming gain) relative to omni-directional or pseudo-omni-directional transmission. Often, a UE 120 may need to switch from one beam, beam pair, or beam set to another beam, beam pair, or beam set, due to movement of the UE 120, changing environmental conditions, changing clusters, and/or the like.

A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, a biometric sensor or device, a wearable device (smart watches, smart clothing, smart glasses, smart wrist bands, smart jewelry (e.g., smart ring, smart bracelet)), an entertainment device (e.g., a music or video device, or a satellite radio), a vehicular component or sensor, a smart meter or sensor, industrial manufacturing equipment, robotics, drones, implantable devices, augmented reality devices, a global positioning system device, or any other suitable device that is configured to communicate via a wireless or wired medium.

UE 120 may be included inside a housing that houses components of UE 120. In such an arrangement, the housing may define one or more external walls and create internal areas configured for carrying or holding components. These components may include processor components, memory components, and/or the like, which are described in connection with FIG. 2. These components may be integrated in a variety of combinations and/or may be stand-alone, distributed components, considering design constraints and/or operational preferences.

The processing device 130 may include a cloud computing platform, a server, a desktop computer, a laptop computer, a network controller, a gNB, and/or the like. The processing device 130 may receive or capture measurements regarding the electric field of the UE 120 and may determine adjacent beam sets based at least in part on the measurements. In some aspects, the processing device 130 may generate and/or provide a codebook based at least in part on the adjacent beam sets, as described below. The processing device 130 may be implemented using a device local to the testing system 100 or a device remote from the testing system 100 (e.g., using a cloud computing system, an edge computing system, and/or the like).

An example coordinate system for the testing system 100 is shown by reference number 135. As shown, a z-axis of the coordinate system 135 extends toward the measurement horn 125. Furthermore, the lower platter 110 may rotate about the y-axis and the upper platter 115 may rotate about the z-axis. An example coordinate system for the UE 120 (e.g., the DUT or wireless communication device) is shown by reference number 140. As shown, an x-axis of the coordinate system 140 extends out of the front surface of the UE 120. As shown by reference number 145, an angle of rotation theta is defined about the y-axis and, as shown by reference number 150, an angle of rotation phi is defined about the z-axis.

The coordinate system 135 is different than the coordinate system 140. If an operator were to attempt to align the coordinate systems 135 and 140, the UE 120 may be difficult to mount to the upper platter 115, since the UE 120 may be mounted to the upper platter 115 on an edge of the UE 120. This may be mechanically difficult and may cause unwanted secondary effects on the measurement. Some techniques and apparatuses described herein provide for determination of the measurement value based at least in part on a mount orientation of the UE 120, which identifies the coordinate system 140 relative to the coordinate system 135.

As indicated above, FIG. 1 is provided as an example. Other examples may differ from what is described in connection with FIG. 1.

Figure 2:
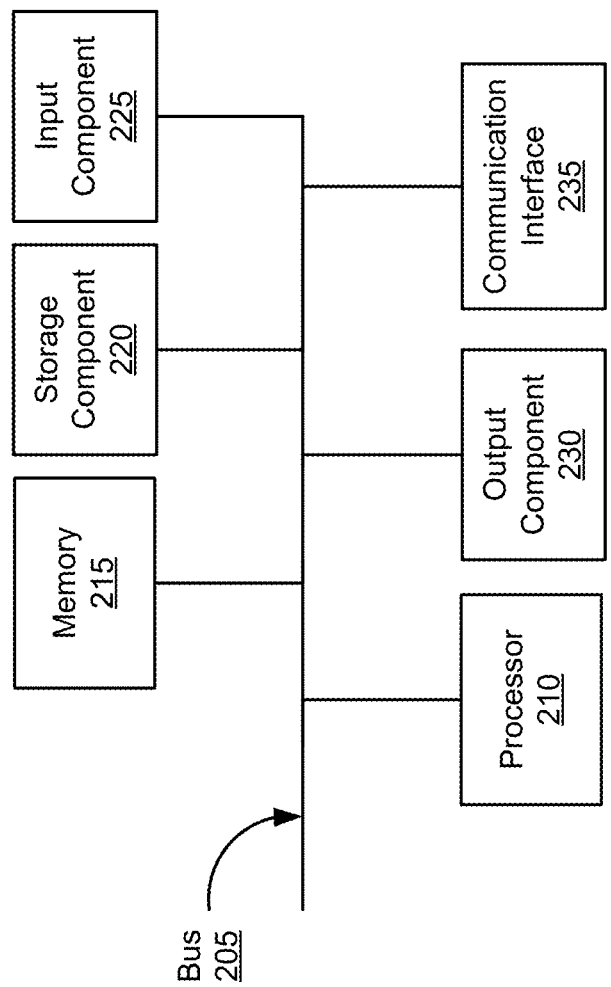
FIG. 2 is a diagram conceptually illustrating example components of one or more devices shown in FIG. 1, such as a wireless communication device or a processing device, in accordance with various aspects of the present disclosure.

FIG. 2 is a diagram of example components of a device 200. Device 200 may correspond to UE 120 and/or processing device 130. Additionally, or alternatively, UE 120 and/or processing device 130 may include one or more devices 200 and/or one or more components of device 200. As shown in FIG. 2, device 200 may include a bus 205, a processor 210, a memory 215, a storage component 220, an input component 225, an output component 230, and a communication interface 235.

Bus 205 includes a component that permits communication among the components of device 200. Processor 210 includes a central processing unit (CPU), a graphics processing unit (GPU), an accelerated processing unit (APU), a digital signal processor (DSP), a microprocessor, a microcontroller, a field-programmable gate array (FPGA), an application-specific integrated circuit (ASIC), a baseband processor, an intermediate frequency processor, a receive processor, a transmit processor, a controller, and/or another type of processing component. Processor 210 is implemented in hardware, firmware, or a combination of hardware and software. In some aspects, processor 210 includes one or more processors capable of being programmed to perform a function.

Memory 215 includes a random-access memory (RAM), a read only memory (ROM), and/or another type of dynamic or static storage device (e.g., a flash memory, a magnetic memory, and/or an optical memory) that stores information and/or instructions for use by processor 210.

Storage component 220 stores information and/or software related to the operation and use of device 200. For example, storage component 220 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 225 includes a component that permits device 200 to receive information, such as via user input (e.g., a touch screen display, a keyboard, a keypad, a mouse, a button, a switch, and/or a microphone). Additionally, or alternatively, input component 225 may include a sensor for sensing information (e.g., an image sensor, a location sensor, an accelerometer, a gyroscope, an actuator, and/or the like). In some aspects, input component 225 may include a camera (e.g., a high-resolution camera, a low-resolution camera, and/or the like). Output component 230 includes a component that provides output from device 200 (e.g., a display, a speaker, and/or one or more light-emitting diodes (LEDs)).

Communication interface 235 includes a transceiver and/or a separate receiver and transmitter that enables device 200 to communicate with other devices, such as via a wired connection, a wireless connection, or a combination of wired and wireless connections. Communication interface 235 may permit device 200 to receive information from another device and/or provide information to another device. For example, communication interface 235 may include an Ethernet interface, an optical interface, a coaxial interface, an infrared interface, a radio frequency (RF) interface, a universal serial bus (USB) interface, a Wi-Fi interface, a cellular network interface, a wireless modem, an inter-integrated circuit ($I^2C$), a serial peripheral interface (SPI), or the like. In some aspects, communication interface 235 may include an antenna array or a set of antenna subarrays that may be configured with multiple antenna elements for multiple-input multiple-output (MIMO) or massive MIMO deployments that can occur in millimeter wave (mmWave or mmW) communication systems. These antenna arrays or subarrays may perform beamforming to achieve improved array gain relative to omni-directional transmission. "Antenna element" is used interchangeably with "antenna" herein.

Device 200 may perform one or more processes described herein. Device 200 may perform these processes in response to processor 210 executing software instructions stored by a non-transitory computer-readable medium, such as memory 215 and/or storage component 220. A computer-readable medium is defined herein as a non-transitory memory device. A memory device includes memory space within a single physical storage device or memory space spread across multiple physical storage devices.

Software instructions may be read into memory 215 and/or storage component 220 from another computer-readable medium or from another device via communication interface 235. When executed, software instructions stored in memory 215 and/or storage component 220 may cause processor 210 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

In some aspects, processor 210 of UE 120, processor 210 of processing device 130, and/or any other component(s) of FIG. 2 may perform one or more techniques associated with adjacent beam determination or measurement, as described in more detail elsewhere herein. For example, processor 210 and/or any other component(s) of FIG. 2 may perform or direct operations of, for example, process 900 of FIG. 9, process 1000 of FIG. 10, process 1100 of FIG. 11, and/or other processes as described herein.

In some aspects, the processing device 130 may include a variety of means or components for implementing processing and/or communication functions. For example, the variety of means may include means for receiving information identifying a mount orientation of a wireless communication device, wherein the mount orientation indicates an orientation of a coordinate system of the wireless communication device relative to a coordinate system of a positioner. In some aspects, the variety of means may include means for capturing measurement information at each position of a set of positions of the wireless communication device, wherein the set of positions comprise positions of the wireless communication device as the wireless communication device is rotated around an axis by the positioner, and wherein the measurement information is captured based at least in part on the mount orientation. In some aspects, the variety of means may include means for providing information identifying the measurement information. In some aspects, the variety of means may include means for transmitting signals to cause the positioner to move the wireless communication device to each position of the set of positions. In some aspects, the variety of means may include means for capturing measurement information for a second antenna of the plurality of antennas at each position of the set of positions. In some aspects, the variety of means may include means for activating only the first antenna in connection with capturing the measurement information for the first antenna. In some aspects, the variety of means may include means for activating only the second antenna in connection with capturing the measurement information for the second antenna. In some aspects, the variety of means may include means for capturing, in each position of the set of positions, second measurement information at a second mount orientation that is different than the first mount orientation. In some aspects, the variety of means may include means for capturing measurement information for a second radio frequency chain of the plurality of radio frequency chains at each position of the set of positions. In some aspects, the variety of means may include means for capturing measurement information for a second radio chip of the plurality of radio chips at each position of the set of positions. In some aspects, the variety of means may include means for causing the wireless communication device to transmit a measurement signal, wherein the measurement information is based at least in part on the measurement signal. In some aspects, the variety of means may include means for receiving electric field information regarding a plurality of beams generated by a plurality of antennas of a wireless communication device, wherein the plurality of beams are generated using a per-antenna measurement procedure. In some aspects, the variety of means may include means for generating a codebook based at least in part on the electric field information, wherein the codebook identifies codewords corresponding to the plurality of beams, and wherein the codebook identifies beam pairs to be used for dual-port communication by the wireless communication device; means for providing information identifying the codebook. In some aspects, the variety of means may include means for determining whether the electric field information relates to measuring the plurality of beams or is simulated electric field information. In some aspects, the variety of means may include means for receiving hardware information relating to a testing device used to collect the electric field information, wherein the hardware information identifies, for an antenna of the plurality of antennas, at least one of: a modem chain, a radio frequency chain, a polarity, or an antenna pin mapping. In some aspects, the variety of means may include means for receiving subarray information for the plurality of antennas, wherein the subarray information identifies one or more subarrays used to generate the plurality of beams, and wherein the codebook is based at least in part on the subarray information. In some aspects, the variety of means may include means for determining whether a beam, generated by the wireless communication device using the codebook, matches an expected beam defined by the codebook. In some aspects, the variety of means may include means for receiving information identifying a mount orientation of the wireless communication device, wherein the mount orientation indicates an orientation of a coordinate system of the wireless communication device relative to a coordinate system of a positioner, and wherein the codebook is based at least in part on the mount orientation. In some aspects, the variety of means may include means for loading a codebook. In some aspects, the variety of means may include means for generating a plurality of beams based at least in part on the codebook. In some aspects, the variety of means may include means for generating the plurality of beams using a respective codeword of a plurality of codewords identified by the codebook; and/or the like. In some aspects, the processing device 130 may include a variety of structural components for carrying out functions of the various means. For example, structural components that carry out functions of such means may include one or more components of the processing device 130 described in connection with FIG. 2, such as bus 205, processor 210, memory 215, storage component 220, input component 225, output component 230, communication interface 235, and/or any combination thereof.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device

200 may perform one or more functions described as being performed by another set of components of device 200.

Figure 3:
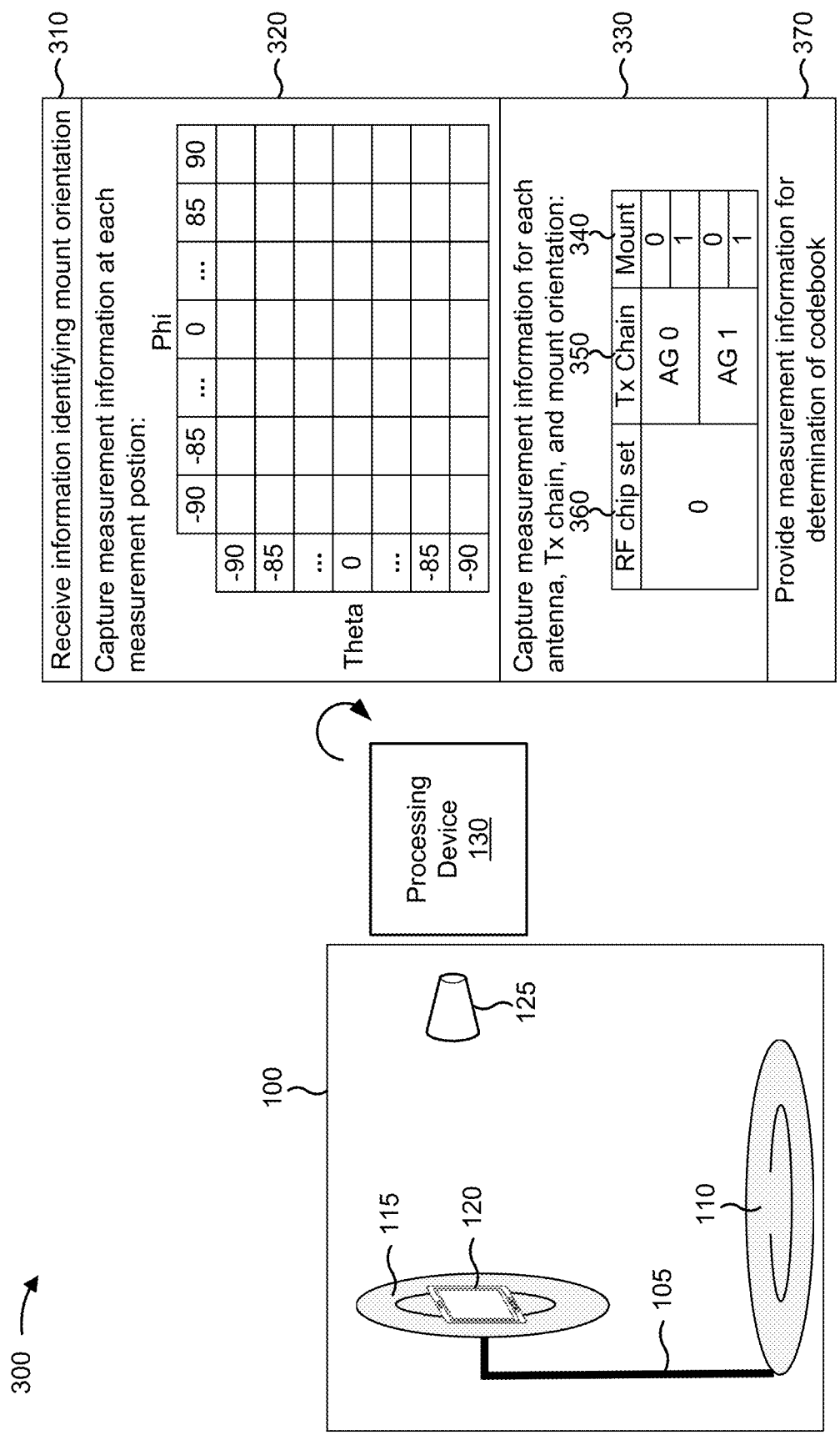
FIG. 3 is a diagram illustrating an example of determining measurement information for a device under test, in accordance with various aspects of the present disclosure.

FIG. 3 is a diagram illustrating an example 300 of determining measurement information for a device under test, in accordance with various aspects of the present disclosure. As shown, example 300 includes a testing system 100 with a device under test (e.g., a UE 120) and a processing device 130.

As shown in FIG. 3, and by reference number 310, the processing device 130 may receive information identifying a mount orientation of the UE 120. The information identifying the mount orientation may identify a set of rotations identifying an orientation of the UE 120 relative to an orientation of the testing system 100. The mount orientation is described in more detail below in connection with FIGS. 5 and 6.

As shown by reference number 320, the processing platform 130 may capture measurement information at each measurement position of a plurality of measurement positions. The testing system 100 may position the UE 120 in each measurement position by rotating the lower platter 110 and/or the upper platter 115. In some aspects, the measurement positions are defined in terms of theta and phi, and examples of theta and phi are provided in FIG. 1. However, the particular axes around which the UE 120 rotates in accordance with theta and phi may vary based at least in part on the mount orientation.

As shown, phi and theta each encompass a 180 degree range. Thus, once measurements are performed at each point corresponding to a particular phi and theta combination, the processing device 130 may determine measurement information for a hemisphere of an electric field of the UE 120. The processing device 130 may store the measurement information in connection with information indicating the mount orientation that was used to determine the measurement information.

As shown by reference number 330, the processing device 130 may capture measurement information for each mount orientation, transmit chain, and antenna of the UE 120. For example, the processing device 130 may capture the measurement information in the orientation shown in FIG. 3 (where the front face of the UE 120 faces the measurement horn 125), and an operator may switch the UE 120 to an orientation opposite that shown in FIG. 3 (e.g., so that the back face of the UE 120 faces the measurement horn 125). Then, the processing device 130 may capture measurement information for each position of the plurality of positions described in connection with reference number 320. Thus, the processing device 130 may capture measurement information for the sphere surrounding the UE 120 by capturing measurement information for two hemispheres of the sphere. In the table associated with reference number 330, the mount orientations are shown by reference number 340.

As shown by reference number 350, the processing device 130 may determine measurement information for each transmit chain of the UE 120. For example, different transmit chains may be associated with different RF properties (e.g., geometry, propagation characteristics, number of antennas, and/or the like). The processing device 130 may determine measurement information for each transmit chain of the UE 120 (shown as antenna group (AG) 0 and AG 1) by deactivating other transmit chains of the UE 120. In some aspects, the processing device 130 may determine measurement information for each transceiver chain of the UE 120.

As shown by reference number 360, the processing device 130 may determine measurement information for each RF chipset of the UE 120. For example, beamforming UEs 120 may have multiple, different antenna modules at different locations of the UE 120. Each antenna module may be associated with a respective RF chipset. The processing device 130 may determine measurement information for each RF chipset, corresponding to each antenna module of the UE 120. In FIG. 3, a single RF chipset is shown. The techniques and apparatuses described herein can be applied for multi-chipset UEs.

In some aspects, the processing device 130 may determine measurement information for a single antenna of the UE 120 at a time (not shown in FIG. 3). For example, the processing device 130 may activate a first antenna of the UE 120 and may deactivate all other antennas of the UE 120. The processing device 130 may capture measurement information for the UE 120 pertaining to signals transmitted only by the first antenna. Then, the processing device 130 may deactivate the first antenna, activate a second antenna, and capture measurement information for the UE 120 pertaining to signals transmitted only by the second antenna. In this case, the processing device 130 may cause the UE 120 to transmit a measurement signal on each antenna individually. For example, the measurement signal may be configured to excite each antenna individually. This may be referred to as an amplitude phase versus time (APvT) based beamforming characterization procedure. In some aspects, this may be referred to herein as per-antenna measurement or a per-antenna measurement procedure. Thus, the processing device 130 may obtain more granular measurement information that identifies per-antenna performance of the UE 120, which enables more optimal codebook generation and more efficient utilization of UE resources, thus improving beamforming gain and beam generation accuracy relative to a codebook generated using less granular measurement information.

In some aspects, the measurement information may include magnitude information (e.g., information identifying a magnitude of an electric field associated with an antenna or beam), phase information (e.g., information identifying a phase of an electric field associated with an antenna or beam), polarity information (e.g., information identifying a polarity associated with a measurement), and/or the like. For example, the measurement horn 125 may collect measurement data at a first polarity (referred to herein as a horizontal polarity or an H polarity) and a second polarity (referred to herein as a vertical polarity or a V polarity). It should be noted that the first polarity and the second polarity can be associated with any direction and are not limited to the horizontal and vertical directions. The measurement horn 125 may collect this measurement data sequentially or contemporaneously. For contemporaneous measurements, each feed of the measurement horn 125 may be connected to a different port of the testing system 100, and horn rotation may be disabled. For sequential measurements, only one feed of the measurement horn 125 may be connected to a port of the testing system 100, and the measurement horn 125 may be rotated by 90 degrees to capture measurement data for the second polarity. In some aspects, the processing device 130 may store information identifying lengths of cables associated with the measurement horn 125, which may be used to determine a trace delay for the measurement information, as described elsewhere herein.

As shown in FIG. 3, and by reference number 370, the processing device 130 may provide measurement information for the determination or generation of a codebook. In some aspects, the processing device 130 may generate the codebook using the measurement information, as described below in connection with FIG. 4. In some aspects, the processing device 130 may provide the measurement information as a set of data structures, such as a set of comma-separated value (CSV) data structures and/or the like. In some aspects, the processing device 130 may store and/or provide information associated with the measurement information, such as hardware information (e.g., which may include information indicating antenna modules, antenna elements, RF chipsets, connections between RF chipsets, antenna modules, and antenna elements, and so on) or subarray information. The subarray information may identify one or more antenna subarrays used to generate a plurality of beams associated with the measurement information. In some aspects, the measurement information may be associated with information that indicates output data mappings of the measurement information, such as hardware information and/or the like. Thus, the measurement information may include or be based at least in part on characteristics of the UE 120, such as the characteristics described above. A codebook may be generated, based at least in part on the characteristics of the UE, to include configured parameters for beam generation.

Figure 7:
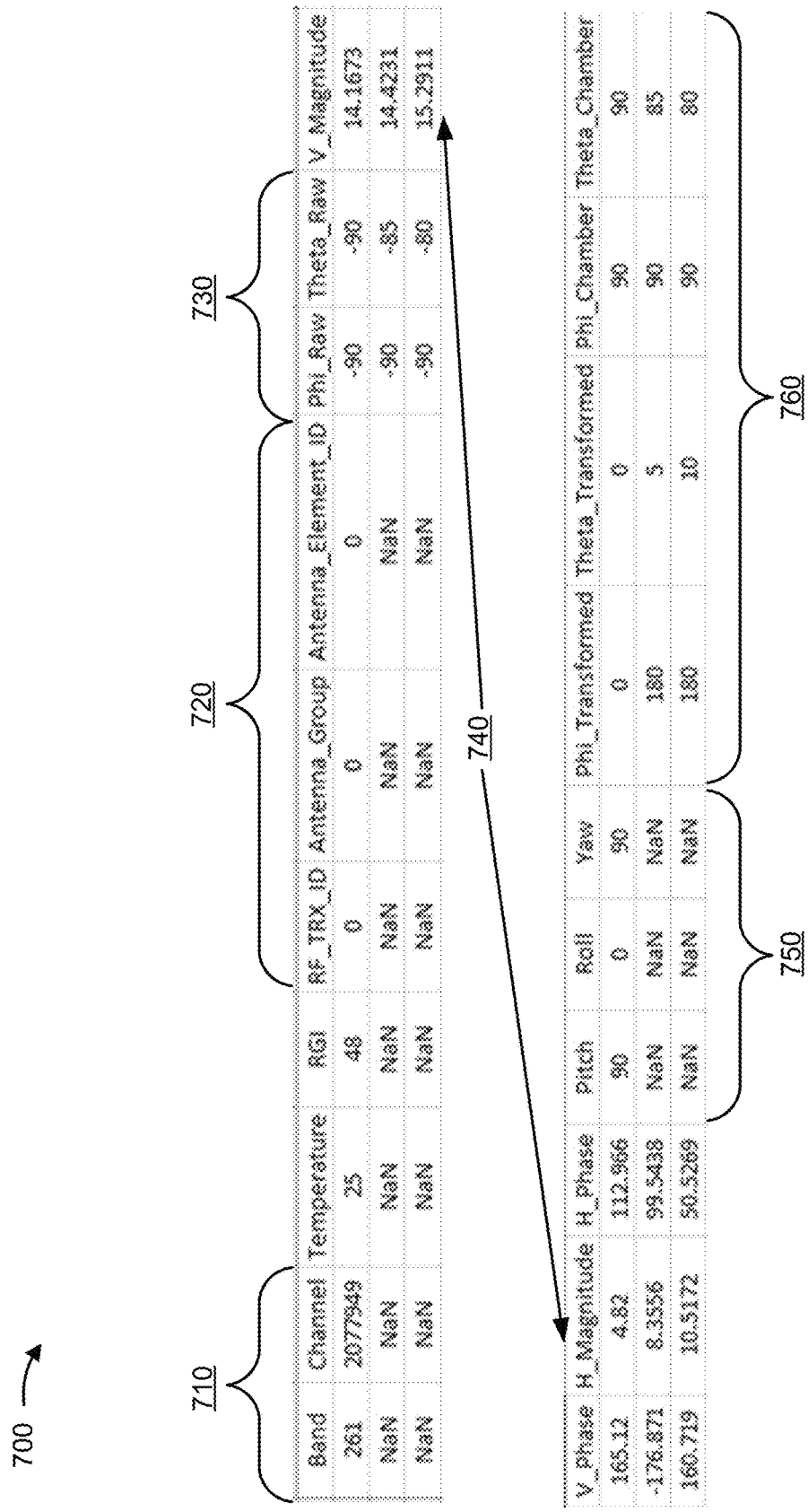
FIG. 7 is a diagram illustrating an example of measurement information for a device under test, in accordance with various aspects of the present disclosure.

As just one example of the format of the measurement information, the measurement information for each antenna element of a UE 120 may be provided in a corresponding data structure. If the UE 120 includes N antenna elements per antenna module and P antenna groups that each include M antenna modules, then the processing device 130 may output M×N×P data structures. Assuming a 5-degree increment in phi and in theta, there may be a total of 37 positions for phi and 37 positions for theta, so each hemisphere may be associated with 37×37=1369 data points, for a total of 2738 data points for each antenna element of the UE 120. The gathering and structuring of this measurement information by the processing device 130 may improve the accuracy and granularity of the measurement information, thereby improving codebook generation and, thus, beamforming gain of the UE 120. Refer to FIG. 7 for an example of measurement information.

As indicated above, FIG. 3 is provided as an example. Other examples may differ from what is described with respect to FIG. 3.

Figure 4:
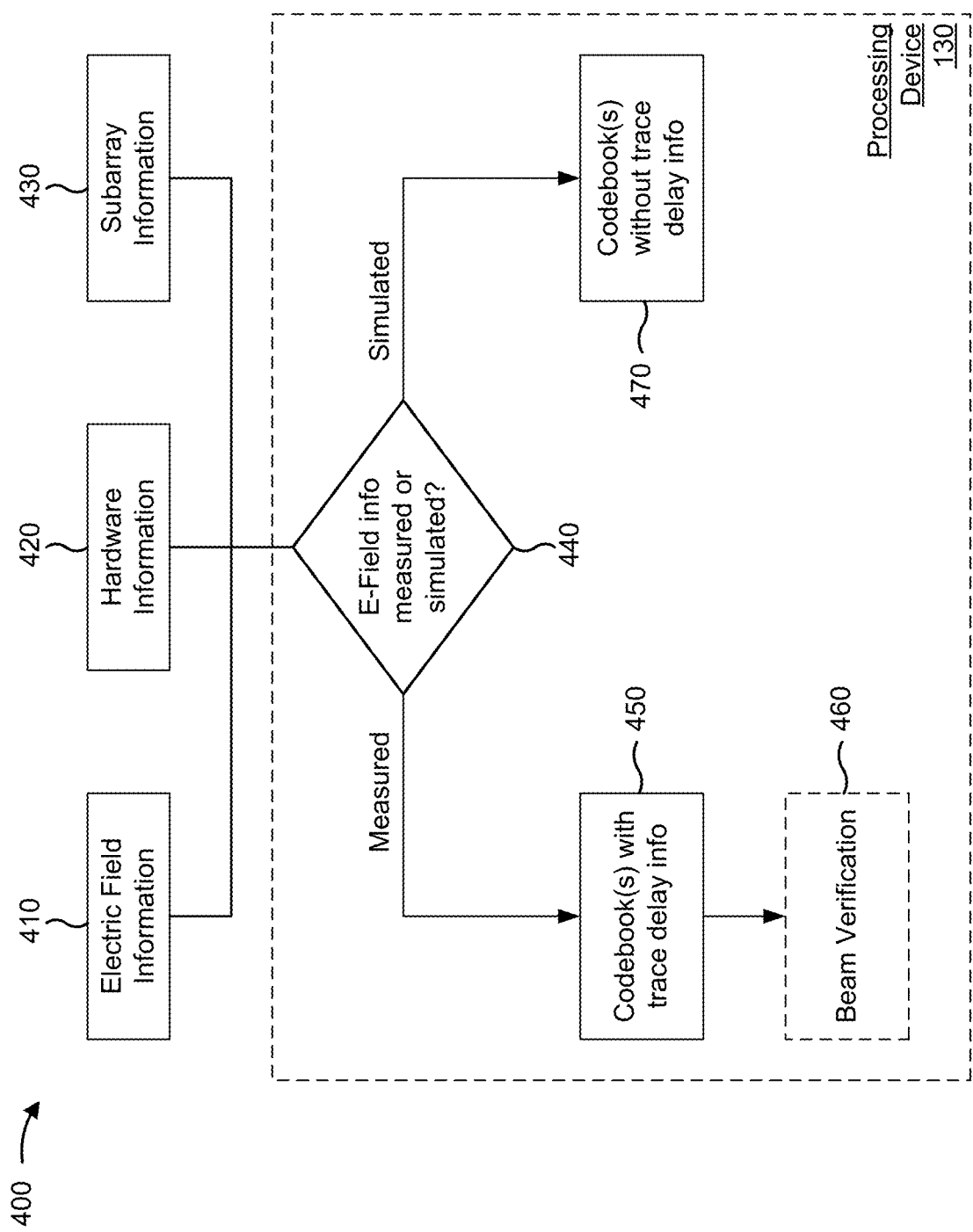
FIG. 4 is a diagram illustrating an example of codebook generation, in accordance with various aspects of the present disclosure.

FIG. 4 is a diagram illustrating an example 400 of codebook generation, in accordance with various aspects of the present disclosure. As shown, the operations described in connection with example 400 may be performed by a processing device 130. The processing device 130 of example 400 may be the same processing device 130 that captures the measurement information or may be a different processing device 130 than the processing device 130 that captures the measurement information.

As shown in FIG. 4, and by reference number 410, the processing device 130 may receive (or capture) electric field information. In some aspects, the electric field information may be measurement information, such as the measurement information described in connection with FIG. 3 above and FIG. 7 below. In some aspects, the electric field information may be simulated electric field information. "Simulated electric field information" may refer to a simulated electric field associated with a simulated UE 120, which the processing device 130 may use to generate a codebook for a simulated UE 120. As shown by reference number 420, the processing device 130 may receive or determine hardware information. As shown by reference number 430, the processing device 130 may receive or determine subarray information. Thus, the processing device 130 may receive or determine information identifying characteristics of the UE 120, such as characteristics that may be configured or set by a manufacturer or servicer of and/or associated with the UE. For example, in some aspects, the information identifying the characteristics of the UE 120 may be specified by an original equipment manufacturer (OEM) of the UE 120. The information specified by the OEM of the UE 120 may include a number of a plurality of antennas of the UE 120, a geometry of the plurality of antennas (e.g., locations of the plurality of antennas, radiative directions of the plurality of antennas, spacings of the plurality of antennas, and/or the like), a radio frequency chain configuration of the UE 120 (e.g., a number of radio frequency chains, a number of antennas per radio frequency chain, and/or the like), or an antenna module configuration of the UE 120 (e.g., a number of antenna modules of the UE 120, a number of antennas per antenna module of the UE 120, and/or the like). In some aspects, the information identifying the characteristics of the UE 120 may be specified by a servicer associated with the processing device 130, such as an operator of the processing device 130. Thus, in some aspects, the information identifying the characteristics of the UE 120 can be specified by an OEM of the UE 120 or a servicer associated with the processing device 130.

As shown by reference number 440, the processing device 130 may determine whether the electric field (E-field) information is measured (e.g., is measurement information) or is simulated (e.g., is simulated electric field information). In some aspects, the processing device 130 may determine whether the electric field information is measurement information or simulated electric field information based at least in part on the electric field information. For example, measurement information may be associated with information regarding connections of the testing system 100, which may indicate trace delays associated with the measurement information, while simulated electric field information may not be associated with information regarding connections of the testing system 100 (since no testing system was used to generate the simulated electric field information). In some aspects, the processing device 130 may determine whether the electric field information is measurement information or simulated electric field information based at least in part on a user input.

As shown by reference number 450, if the electric field information is measurement information, the processing device 130 may generate one or more codebooks that include or are based at least in part on trace delay information associated with the measurement information. The trace delay information may identify a trace delay (e.g., a propagation delay) associated with a horizontal polarity measurement and a trace delay associated with a vertical polarity measurement. The trace delay may be caused by cables associated with the measurement horn 125. Thus, when the cables are substantially equal in length and/or physical properties, an effect of trace delay on the measurement information may be minimized, thereby improving the accuracy and beamforming gain of beams generated using the codebook.

The codebook may identify codewords corresponding to beams to be generated by the UE 120. For example, the codebook may indicate parameters for beam generation by the UE 120 using a plurality of antennas of the UE 120. These parameters may be referred to as configured parameters since these parameters are configured by the processing device 130. In some aspects, the configured parameters may not be user-configurable (e.g., may be configurable only by the processing device 130 or by a servicer or operator associated with the processing device 130, rather than an OEM of the UE 120). The codewords may be used to precode communications for transmission on the respective beams. In some aspects, the codebook may identify beam pairs to be used for dual-port communication by the UE 120. For example, the codebook may include information identifying pairs of beams (e.g., pairs of radio frequency ports corresponding to the pairs of beams) that can be used for communication in various spatial regions, conditions at the UE 120, and/or the like. The usage of the beam pairs may reduce delay when the UE 120 is to switch from a first beam to a second beam, such as by reducing search time or constraining the number of search candidates when switching from the first beam.

In some aspects, the codebook may indicate beams associated with a plurality of levels. A level of beam may be associated with a particular beam width and a particular beam gain. As the level changes, the beam width and the beam gain may change. As one example, when the level increases, the beam width may decrease and the beam gain may increase. The codebook may include a plurality of levels, such as two levels, three levels, or a different number of levels. The usage of the levels of beams may improve efficiency of beam refinement operations of the UE 120. More particularly, the usage of three levels of beams may provide a desirable balance between beam width and beam-forming gain, since a wide beam, an intermediate beam, and a narrow beam can be formed using the three-level codebook approach.

In some aspects, the codebook may indicate a parent-child relationship of two or more beams. A parent beam may be a beam associated with a lower level (e.g., a larger beam width and a lower beam gain) and a child beam may be a beam associated with a higher level. The UE 120 may move from a parent beam to a corresponding child beam as part of a beam refinement procedure. For example, the UE 120 may perform measurement on child beams corresponding to a parent beam, or on parent beams corresponding to a child beam, as part of a beam refinement procedure. The usage of the parent-child relationships may improve efficiency of beam refinement operations of the UE 120 by reducing the number of candidate beams for beam refinement operations.

In some aspects, the codebook may indicate a particular number of beams associated with a subarray. For example, the codebook may indicate a number of beams per subarray. In other words, the codebook may configure the number of beams per subarray of the UE 120. In some aspects, the number of beams per subarray may be an odd number. For example, each subarray may be associated with an odd number of beams (e.g., the same number of beams or different numbers of beams). In some aspects, each subarray may be associated with an even number of beams.

In some aspects, the codebook may indicate beams associated with each multiple-input multiple-output (MIMO) layer of the UE 120. For example, MIMO may enable multi-layer communication by the UE 120, thereby increasing throughput by increased complexity. The codebook may include codewords for each beam to be generated at each MIMO layer. In some aspects, the codebook may indicate a number of beams, per level and per subarray, that is equal for each MIMO layer. This may simplify determination of the beams and improve consistency of performance of the UE 120 across different MIMO layers.

In some aspects, the codebook may be based at least in part on per-antenna measurement of the UE 120's performance. In this case, the codebook may cause excitement of some antennas of the UE and not other antennas of the UE. For example, the codebook may cause excitement of only some antennas of a particular sub-array, of a particular antenna module, and/or the like. Thus, efficiency and beam-forming gain of the UE 120 may be improved by a codebook generated using a per-antenna measurement procedure.

As shown by reference number 460, the processing device 130 (or the testing system 100) may optionally perform beam verification. "Beam verification" may refer to determining whether an observed beam, generated using the codebook, matches an expected beam defined by the codebook. In some aspects, the processing device 130 may determine updated measurement information for the beam verification. For example, the processing device 130 may determine measurement information as described in connection with FIG. 3, above, for the UE 120 using the codebook. The processing device 130 may determine whether the updated measurement information satisfies a threshold accuracy value and/or the like. In some aspects, the processing device 130 may determine a cumulative density function (CDF) or a complementary CDF (CCDF) for the UE 120. The CDF or CCDF may indicate power levels of signals generated by the UE 120 and/or an amount of time or probability that a signal is above an average power level of the signal. The CDF or CCDF may be used to identify aberrant transmit power of the UE 120 (e.g., based at least in part on a misconfigured beam and/or the like).

As shown by reference number 470, when the electric field information is simulated electric field information, the processing device 130 may generate a codebook that does not include or is not based at least in part on trace delay information. For example, the codebook may not include trace delay information since the simulated electric field information is not associated with trace delay information. Though beam verification is not shown in connection with reference number 470, in some aspects, the processing device 130 and/or the testing system 100 may perform beam verification using the codebook, which may enable testing of accuracy of the simulated electric field information.

As indicated above, FIG. 4 is provided as an example. Other examples may differ from what is described with respect to FIG. 4.

Figure 5:
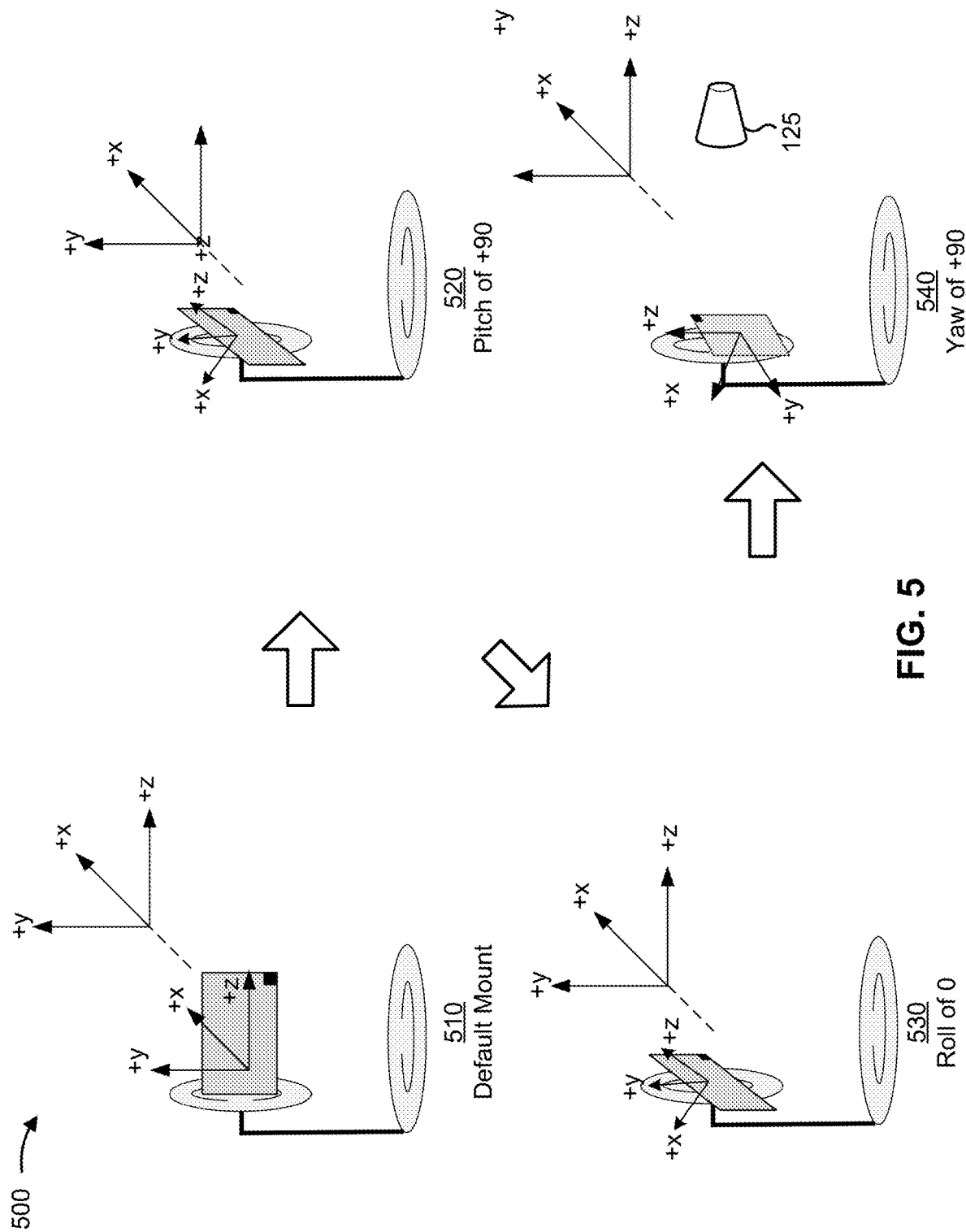
FIG. 5 is a diagram illustrating examples of mount orientations of a device under test, in accordance with various aspects of the present disclosure.

FIG. 5 is a diagram illustrating examples 500 of mount orientations of a device under test, in accordance with various aspects of the present disclosure. Reference number 510 shows a mount orientation in which the coordinate system of the UE 120 and the coordinate system of the testing system 100 are aligned with each other. It can be seen that this orientation may lead to negative effects on measurement accuracy and practicality. Some techniques and apparatuses described herein provide a method for specifying the UE 120's coordinate system relative to the testing system 100's coordinate system, which enables measurement in a variety of testing systems associated with different coordinate systems.

In some aspects, the UE 120's coordinate system may be specified relative to the testing system 100's coordinate system using a series of transformations, such as pitch, roll, and yaw transformations. By applying the transformations in a predetermined order, the UE 120's coordinate system can be specified relative to the testing system 100's coordinate system. Here, a pitch transformation (shown by reference number 520) is a rotation about the y-axis of the UE 120, a roll transformation (shown by reference number 530 with a zero value) is a rotation about the z-axis of the UE 120, and a yaw transformation (shown by reference number 540) is a rotation about the x-axis of the UE 120. Thus, the mount orientation shown by reference number 540, in which a back surface of the UE 120 is toward a measurement horn 125, may be associated with a mount orientation of [90 0 90], corresponding to pitch, roll, and yaw values of 90 degrees, 0 degrees, and 90 degrees, respectively.

As indicated above, FIG. 5 is provided as an example. Other examples may differ from what is described with respect to FIG. 5.

Figure 6:
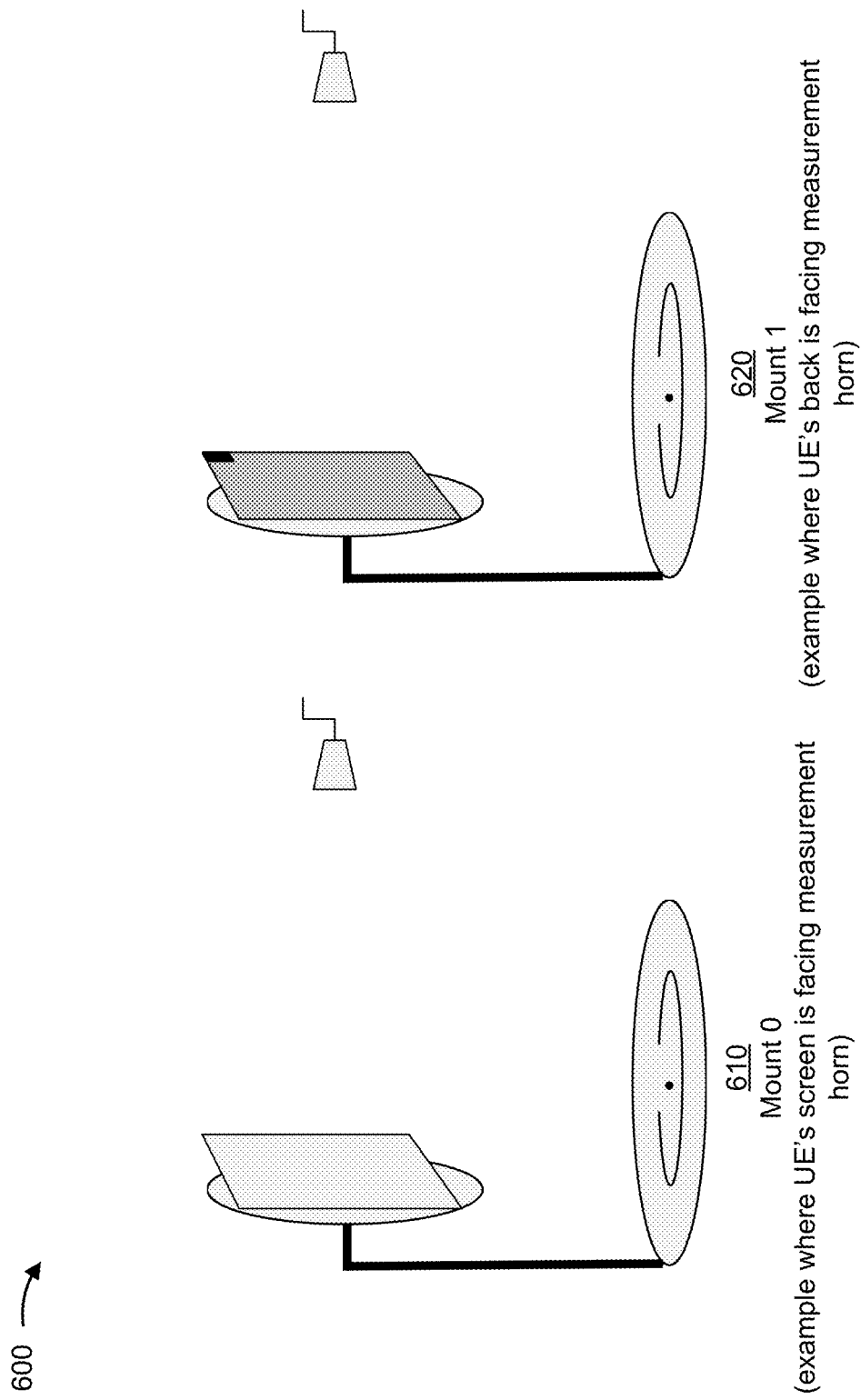
FIG. 6 is a diagram illustrating an example of transformations between a testing system's coordinate system and a device under test's mount orientation, in accordance with various aspects of the present disclosure.

FIG. 6 is a diagram illustrating an example 600 of transformations between a testing system's coordinate system and a device under test's mount orientation, in accordance with various aspects of the present disclosure. As shown by reference number 610, in a first mount orientation, the UE 120's screen may face the measurement horn 125. Thus, the processing device 130 may capture measurement information for a first hemisphere of a sphere surrounding the UE 120. As shown by reference number 620, in a second mount orientation, the UE 120's back surface may face the measurement horn 120. This may be associated with a mount orientation of [0 180 0] or [180 0 0] relative to the position shown by reference number 610. In this position, the processing device 130 may capture measurement information for a second hemisphere of the sphere surrounding the UE 120, thus completing the measurement information for the sphere. The change in the position from the position shown by reference number 610 to the position shown by reference number 620 may be performed by the testing system 100 or by a user.

As indicated above, FIG. 6 is provided as an example. Other examples may differ from what is described with respect to FIG. 6.

FIG. 7 is a diagram illustrating an example 700 of measurement information for a device under test, in accordance with various aspects of the present disclosure. This measurement information may be gathered using a per-antenna measurement procedure, and may be based at least in part on characteristics (e.g., OEM- or servicer-controllable characteristics) of the device under test, which may improve beamforming gain of a UE using a codebook that is generated using the measurement information. As shown by reference number 710, the measurement information may identify a band and/or a channel associated with the measurement information. As shown by reference number 720, the measurement information may identify an RF chipset (e.g., RF_TRX_ID), an antenna group, and an antenna element for each data point. As shown by reference number 730, the measurement information may identify phi and theta values corresponding to positions of each data point. Here, three data points are shown, with theta incrementing by +5 degrees in each position. As shown by reference number 740, the measurement information may identify magnitude and phase values for the vertical polarity (e.g., V_Magnitude and V_Phase) and for the horizontal polarity (e.g., H_Magnitude and H_Phase). As shown by reference number 750, the measurement information may identify pitch, roll, and yaw values for the measurements. In other words, the measurement information may identify the mount orientation used to generate the measurement information. As shown by reference number 760, the measurement information may include information indicating phi and theta values as transformed in accordance with the measurement information (e.g., Phi_Transformed and Theta_Transformed) and phi and theta values in the coordinate system of the testing chamber 100 (e.g., Phi_Chamber and Theta_Chamber).

As indicated above, FIG. 7 is provided as an example. Other examples may differ from what is described with respect to FIG. 7.

Figure 8:
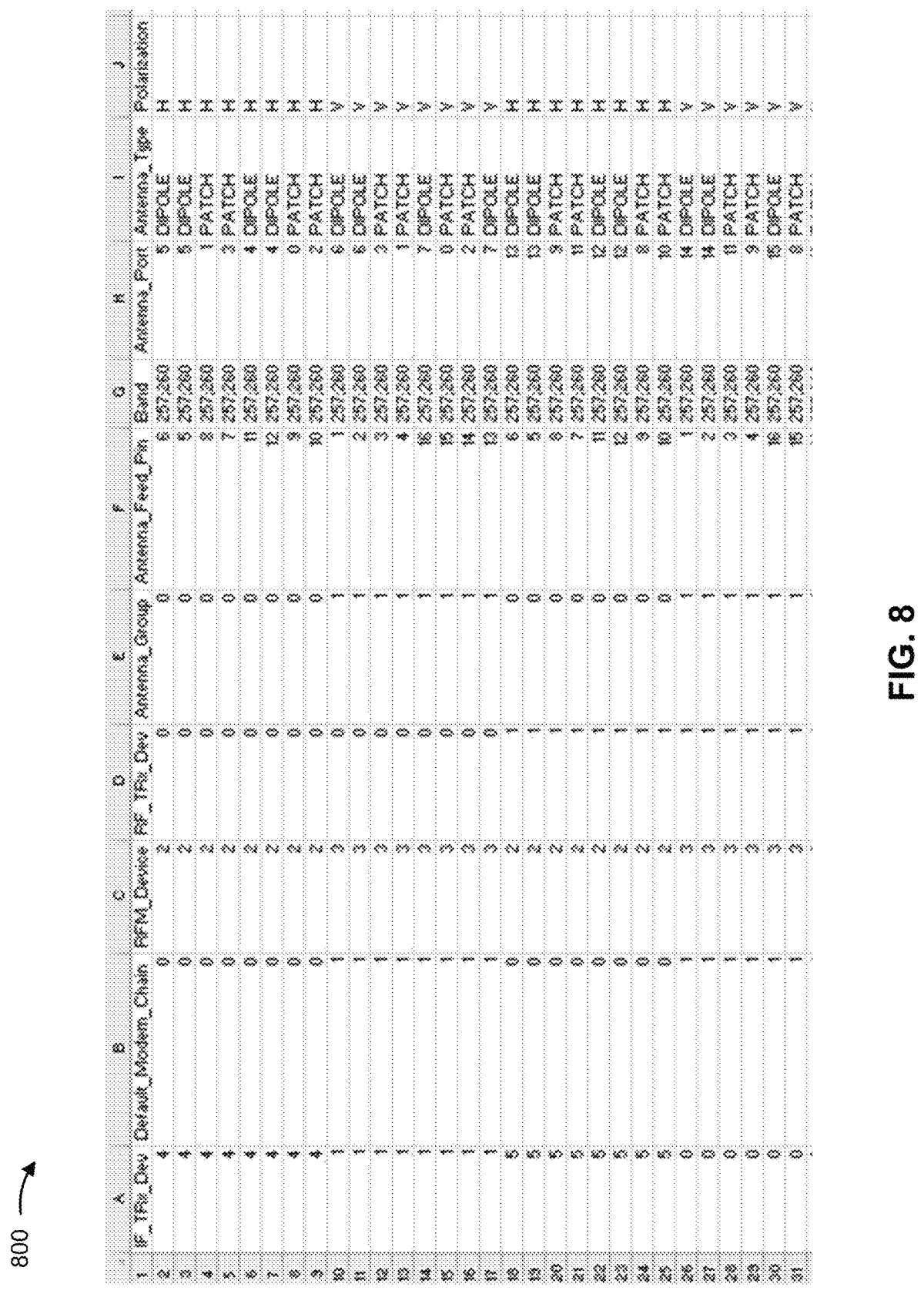

FIG. 8 is a diagram illustrating an example 800 of hardware information for a device under test, in accordance with various aspects of the present disclosure. As shown, the hardware information may identify mappings between an intermediate frequency transceiver (column A) associated with a particular antenna element, a modem transceiver chain associated with the particular antenna element (column B), a radio frequency monitoring (RFM) device associated with the particular antenna element (column C), an RF transceiver chain associated with the particular antenna element (column D), an antenna group associated with the particular antenna element (column E), an antenna feed pin associated with the particular antenna element (column F), a band associated with the particular antenna element (column G), an antenna port associated with the particular antenna element (column H), an antenna type associated with the particular antenna element (column I), and/or a polarity associated with the particular antenna element (column J).

As indicated above, FIG. 8 is provided as an example. Other examples may differ from what is described with respect to FIG. 8.

Figure 9:
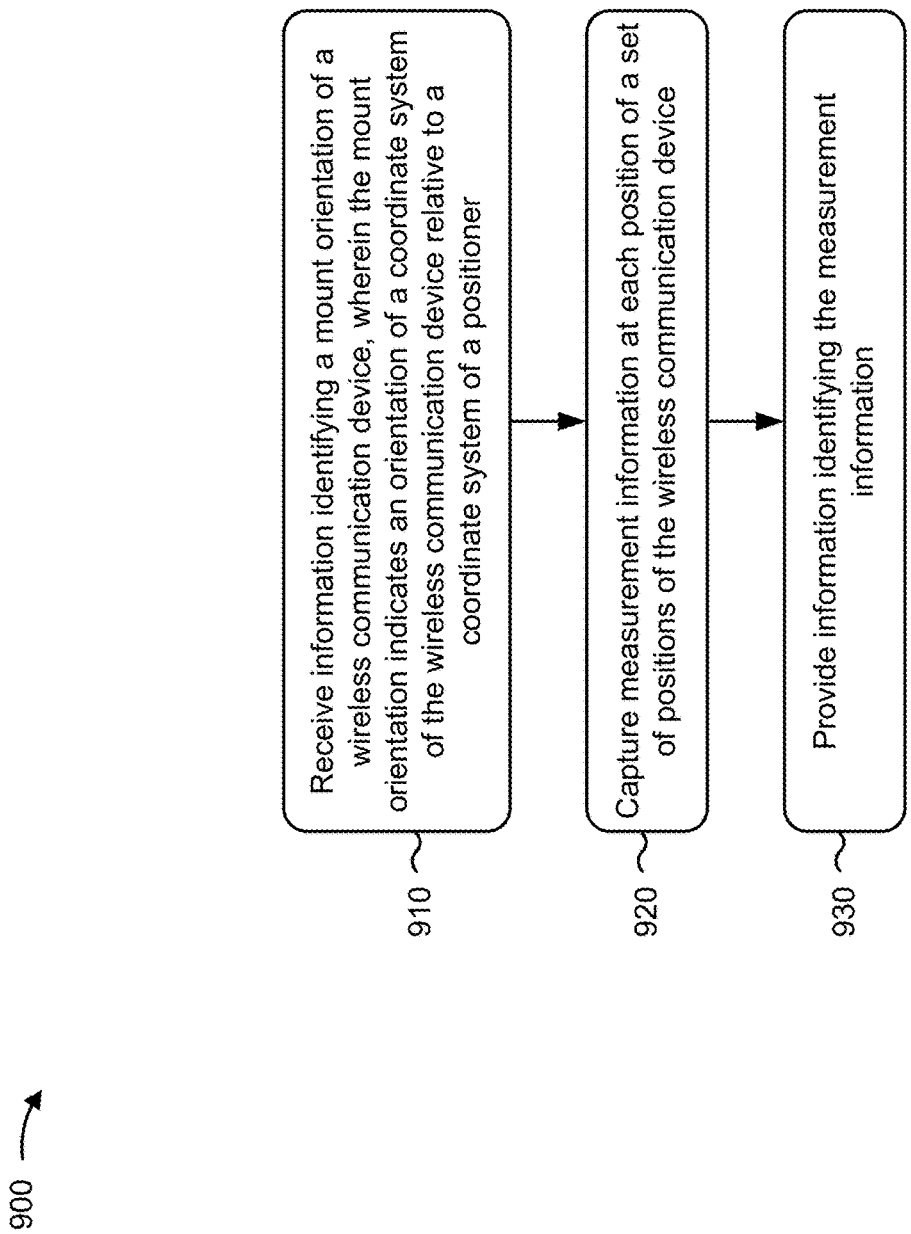
FIG. 9 is a diagram illustrating an example process performed, for example, by a device, in accordance with various aspects of the present disclosure.

FIG. 9 is a diagram illustrating an example process 900 performed, for example, by a device, in accordance with various aspects of the present disclosure. Example process 900 is an example where a device (e.g., processing device 130, testing system 100, and/or the like) performs operations associated with beam measurement and/or characterization.

As shown in FIG. 9, in some aspects, process 900 may include receiving information identifying a mount orientation of a wireless communication device, wherein the mount orientation indicates an orientation of a coordinate system of the wireless communication device relative to a coordinate system of a positioner (block 910). For example, the device (e.g., using the processor 210, the memory 215, the storage component 220, the input component 225, the output component 230, the communication interface 235, and/or the like) may receive information identifying a mount orientation of a wireless communication device (e.g., UE 120), as described above. In some aspects, the mount orientation indicates an orientation of a coordinate system of the wireless communication device relative to a coordinate system of a positioner.

As further shown in FIG. 9, in some aspects, process 900 may include capturing measurement information at each position of a set of positions of the wireless communication device (block 920). For example, the device (e.g., using the processor 210, the memory 215, the storage component 220, the input component 225, the output component 230, the communication interface 235, and/or the like) may capture measurement information at each position of a set of positions of the wireless communication device, as described above. In some aspects, the set of positions comprise positions of the wireless communication device as the wireless communication device is rotated around an axis by the positioner. In some aspects, the measurement information is captured based at least in part on the mount orientation.

As further shown in FIG. 9, in some aspects, process 900 may include providing information identifying the measurement information (block 930). For example, the device (e.g., using the processor 210, the memory 215, the storage component 220, the input component 225, the output component 230, the communication interface 235, and/or the like) may provide information identifying the measurement information, as described above.

Process 900 may include additional aspects, such as any single aspect or any combination of aspects described below and/or in connection with one or more other processes described elsewhere herein.

In a first aspect, the device may transmit signals to cause the positioner to move the wireless communication device to each position of the set of positions.

In a second aspect, alone or in combination with the first aspect, the measurement information comprises magnitude information and phase information for a plurality of beams of the wireless communication device.

In a third aspect, alone or in combination with one or more of the first and second aspects, the measurement information is for a first antenna of a plurality of antennas of the wireless communication, and the device may capture measurement information for a second antenna of the plurality of antennas at each position of the set of positions.

In a fourth aspect, alone or in combination with one or more of the first through third aspects, the device may activate only the first antenna in connection with capturing the measurement information for the first antenna, and activate only the second antenna in connection with capturing the measurement information for the second antenna.

In a fifth aspect, alone or in combination with one or more of the first through fourth aspects, the mount orientation is a first mount orientation and the measurement information is first measurement information, and the device may capture, in each position of the set of positions, second measurement information at a second mount orientation that is different than the first mount orientation.

In a sixth aspect, alone or in combination with one or more of the first through fifth aspects, the first measurement information is associated with a first hemisphere of a sphere surrounding the wireless communication device, and the second measurement information is associated with a second hemisphere of the sphere surrounding the wireless communication device that is different than the first hemisphere.

In a seventh aspect, alone or in combination with one or more of the first through sixth aspects, the measurement information includes measurement information for a first polarity and measurement information for a second polarity.

In an eighth aspect, alone or in combination with one or more of the first through seventh aspects, the measurement information for the first polarity and the measurement information for the second polarity are captured contemporaneously.

In a ninth aspect, alone or in combination with one or more of the first through eighth aspects, the measurement information includes information indicating lengths of cables used to capture the measurement information for the first polarity and the measurement information for the second polarity contemporaneously.

In a tenth aspect, alone or in combination with one or more of the first through ninth aspects, the measurement information for the first polarity and the measurement information for the second polarity are captured sequentially.

In an eleventh aspect, alone or in combination with one or more of the first through tenth aspects, the measurement information is for a first radio frequency chain of a plurality of radio frequency chains of the wireless communication device. In some aspects, the device may capture measurement information for a second radio frequency chain of the plurality of radio frequency chains at each position of the set of positions.

In a twelfth aspect, alone or in combination with one or more of the first through eleventh aspects, the measurement information is for a first radio chip of a plurality of radio chips of the wireless communication device. In some aspects, the device may capture measurement information for a second radio chip of the plurality of radio chips at each position of the set of positions.

In a thirteenth aspect, alone or in combination with one or more of the first through twelfth aspects, the device may cause the wireless communication device to transmit a measurement signal, wherein the measurement information is based at least in part on the measurement signal.

In a fourteenth aspect, alone or in combination with one or more of the first through thirteenth aspects, the measurement information identifies the set of positions of the wireless communication device relative to the coordinate system of the positioner based at least in part on the mount orientation.

In a fifteenth aspect, alone or in combination with one or more of the first through fourteenth aspects, the set of positions are separated from each other by a particular angular separation around the first axis or around the second axis.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
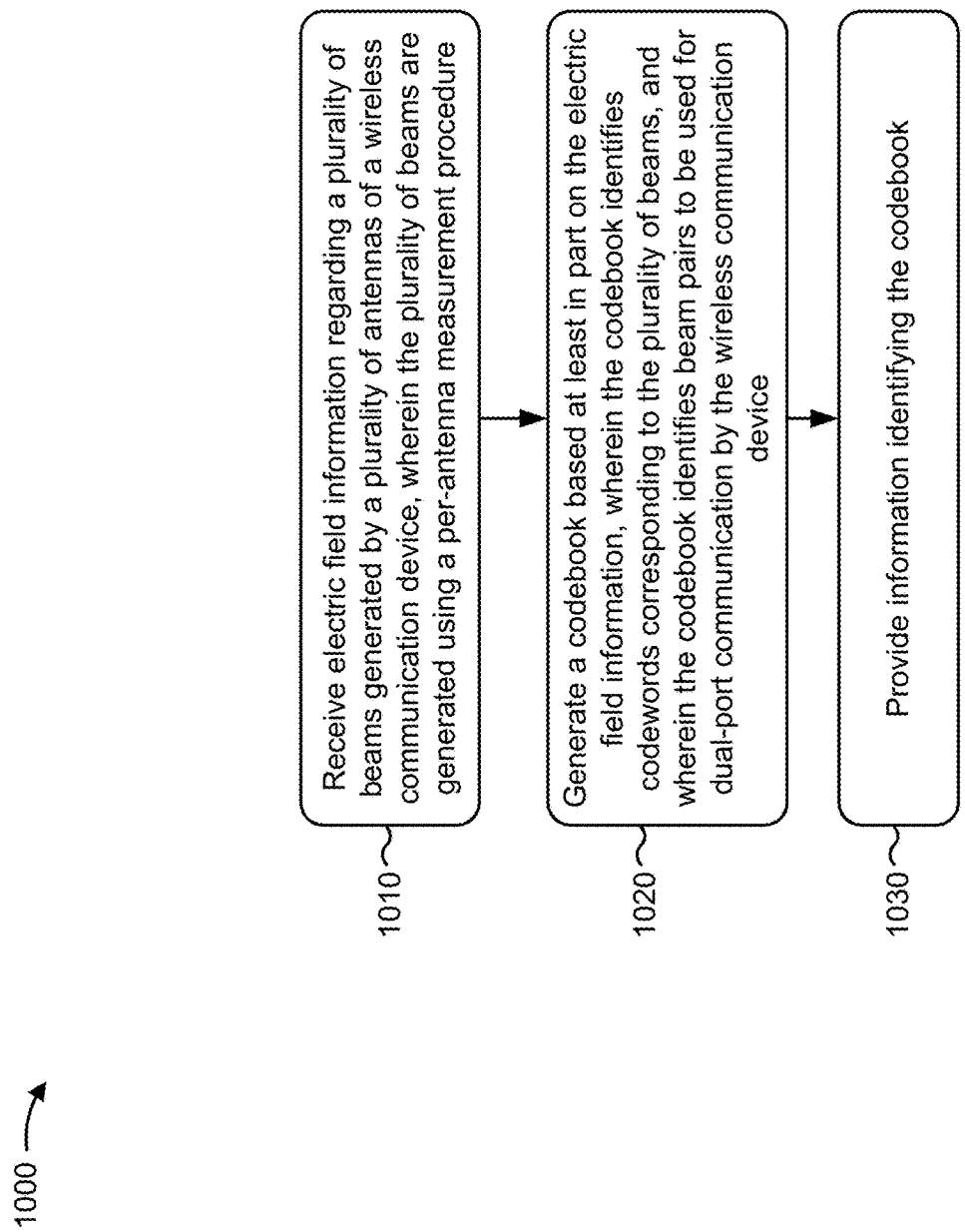
FIG. 10 is a diagram illustrating an example process performed, for example, by a device, in accordance with various aspects of the present disclosure.

FIG. 10 is a diagram illustrating an example process 1000 performed, for example, by a device, in accordance with various aspects of the present disclosure. Example process 1000 is an example where a device (e.g., processing device 130, testing system 100, and/or the like) performs operations associated with beam characterization.

As shown in FIG. 10, in some aspects, process 1000 may include receiving electric field information regarding a plurality of beams generated by a plurality of antennas of a wireless communication device, wherein the plurality of beams are generated using a per-antenna measurement procedure (block 1010). For example, the device (e.g., using the processor 210, the memory 215, the storage component 220, the input component 225, the output component 230, the communication interface 235, and/or the like) may receive electric field information regarding a plurality of beams generated by a plurality of antennas of a wireless communication device, as described above. In some aspects, the plurality of beams are generated using a per-antenna measurement procedure.

As further shown in FIG. 10, in some aspects, process 1000 may include generating a codebook based at least in part on the electric field information, wherein the codebook identifies codewords corresponding to the plurality of beams, and wherein the codebook identifies beam pairs to be used for dual-port communication by the wireless communication device (block 1020). For example, the device (e.g., using the processor 210, the memory 215, the storage component 220, the input component 225, the output component 230, the communication interface 235, and/or the like) may generate a codebook based at least in part on the electric field information, as described above. In some aspects, the codebook identifies codewords corresponding to the plurality of beams. In some aspects, the codebook identifies beam pairs to be used for dual-port communication by the wireless communication device.

As further shown in FIG. 10, in some aspects, process 1000 may include providing information identifying the codebook (block 1030). For example, the device (using the processor 210, the memory 215, the storage component 220, the input component 225, the output component 230, the communication interface 235, and/or the like) may provide information identifying the codebook, as described above.

Process 1000 may include additional aspects, such as any single aspect or any combination of aspects described below and/or in connection with one or more other processes described elsewhere herein.

In a first aspect, the electric field information is generated by measuring the plurality of beams.

In a second aspect, alone or in combination with the first aspect, the electric field information is simulated electric field information.

In a third aspect, alone or in combination with one or more of the first and second aspects, when the electric field information relates to measuring the plurality of beams, the information identifying the codebook identifies trace delay information associated with the plurality of beams, and when the electric field information is simulated electric field information, the information identifying the codebook does not identify the trace delay information.

In a fourth aspect, alone or in combination with one or more of the first through third aspects, the device may determine whether the electric field information relates to measuring the plurality of beams or is simulated electric field information.

In a fifth aspect, alone or in combination with one or more of the first through fourth aspects, the electric field information identifies phase information and amplitude information for each beam of the plurality of beams.

In a sixth aspect, alone or in combination with one or more of the first through fifth aspects, the electric field information identifies phase information and amplitude information for each antenna of the plurality of antennas.

In a seventh aspect, alone or in combination with one or more of the first through sixth aspects, the electric field information identifies phase information and amplitude information for each antenna, of the plurality of antennas, in isolation from all other antennas of the plurality of antennas.

In an eighth aspect, alone or in combination with one or more of the first through seventh aspects, the device may receive hardware information relating to a testing device used to collect the electric field information, wherein the hardware information identifies, for an antenna of the plurality of antennas, at least one of: a modem chain, a radio frequency chain, a polarity, or an antenna pin mapping.

In a ninth aspect, alone or in combination with one or more of the first through eighth aspects, the device may receive subarray information for the plurality of antennas, wherein the subarray information identifies one or more subarrays used to generate the plurality of beams, and wherein the codebook is based at least in part on the subarray information.

In a tenth aspect, alone or in combination with one or more of the first through ninth aspects, the device may determine whether a beam, generated by the wireless communication device using the codebook, matches an expected beam defined by the codebook.

In an eleventh aspect, alone or in combination with one or more of the first through tenth aspects, determining whether the beam matches the expected beam is based at least in part on a per-beam measurement of phase or amplitude.

In a twelfth aspect, alone or in combination with one or more of the first through eleventh aspects, determining whether the beam matches the expected beam is based at least in part on a spherical cumulative distribution function of beam power.

In a thirteenth aspect, alone or in combination with one or more of the first through twelfth aspects, the electric field information is based at least in part on measurement information captured at each position of a set of positions of the wireless communication device. In some aspects, the set of positions comprises positions of the wireless communication device as the wireless communication device is rotated around an axis by the positioner.

In a fourteenth aspect, alone or in combination with one or more of the first through thirteenth aspects, the device may receive information identifying a mount orientation of the wireless communication device, wherein the mount orientation indicates an orientation of a coordinate system of the wireless communication device relative to a coordinate system of a positioner, and wherein the codebook is based at least in part on the mount orientation.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
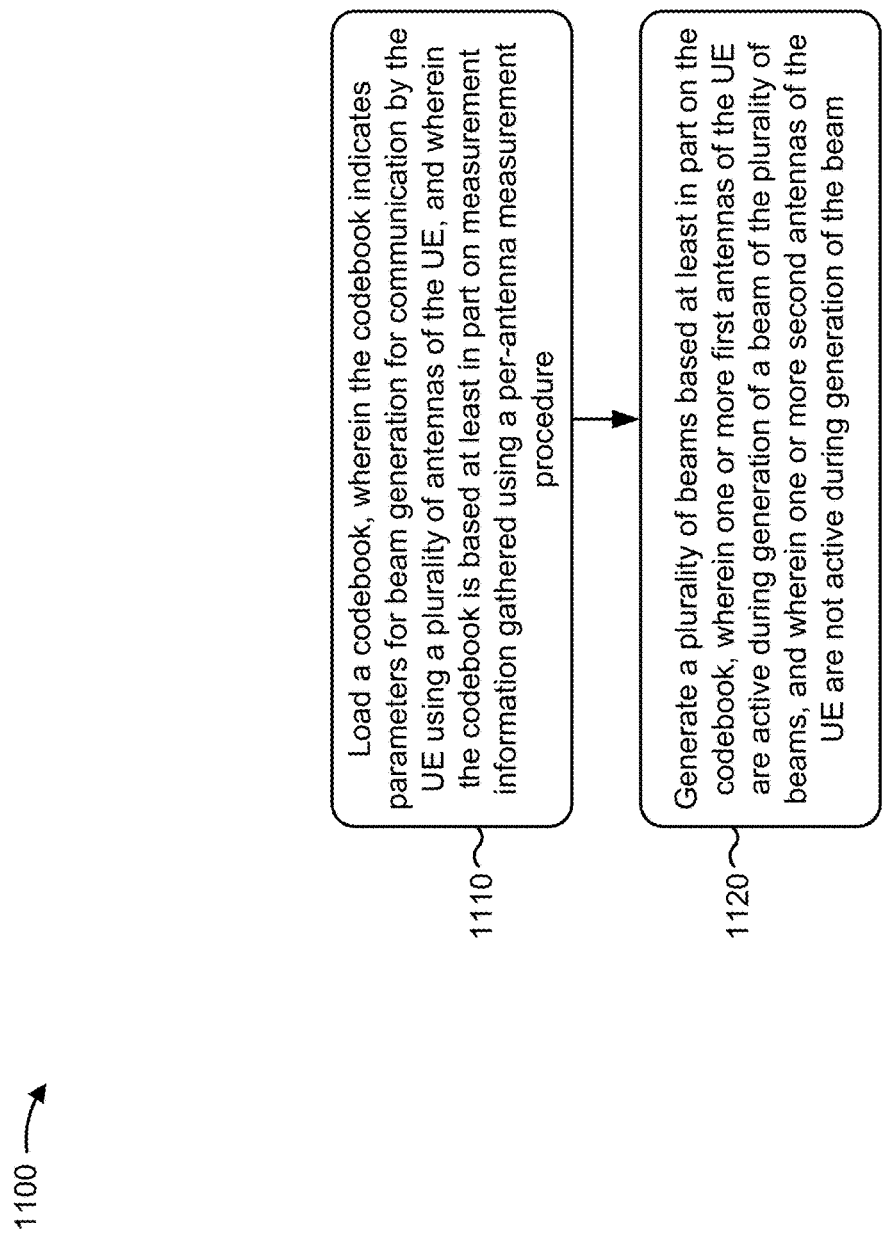
FIG. 11 is a diagram illustrating an example process performed, for example, by a user equipment, in accordance with various aspects of the present disclosure.

FIG. 11 is a diagram illustrating an example process 1100 performed, for example, by a UE, in accordance with various aspects of the present disclosure. Example process 1100 is an example where a user equipment (e.g., UE 120 and/or the like) generates a beam based at least in part on a codebook.

As shown in FIG. 11, in some aspects, process 1100 may include loading a codebook, wherein the codebook indicates parameters for beam generation for communication by the UE using a plurality of antennas of the UE, and wherein the codebook is based at least in part on measurement information gathered using a per-antenna measurement procedure (block 1110). For example, the UE (e.g., using controller/processor 280, transmit processor 264, transmit (TX) MIMO processor 266, MOD 254, DEMOD 254, MIMO detector 256, receive processor 258, and/or the like) may load a codebook. In some aspects, the UE may load the codebook upon activation of the UE (e.g., upon powering on, upon factory configuration, upon carrier configuration, upon OEM configuration, and/or the like). In some aspects, the UE may load the codebook based at least in part on a BS-driven codebook request. For example, a BS may instruct the UE to load a particular codebook based at least in part on a power management condition and/or the like. The codebook indicates parameters for beam generation for communication by the UE using a plurality of antennas of the UE, and the codebook may be based at least in part on measurement information gathered using a per-antenna measurement procedure, as described above.

As further shown in FIG. 11, in some aspects, process 1100 may include generating a plurality of beams based at least in part on the codebook, wherein one or more first antennas of the UE are active during generation of a beam of the plurality of beams, and wherein one or more second antennas of the UE are not active during generation of the beam (block 1120). For example, the UE (e.g., using controller/processor 280, transmit processor 264, TX MIMO processor 266, MOD 254, DEMOD 254, MIMO detector 256, receive processor 258, and/or the like) may generate a plurality of beams based at least in part on the codebook, as described above. In some aspects, one or more first antennas of the UE are active during generation of a beam of the plurality of beams. In some aspects, one or more second antennas of the UE are not active during generation of the beam.

Process 1100 may include additional aspects, such as any single aspect or any combination of aspects described below and/or in connection with one or more other processes described elsewhere herein.

In a first aspect, the one or more first antennas and the one or more second antennas are part of a same antenna subarray or a same antenna module.

In a second aspect, alone or in combination with the first aspect, the parameters for beam generation relate to two or more levels of beams, wherein a first level, of the two or more levels, is associated with a wider beam width and a lower beam gain, and wherein a second level, of the two or more levels, is associated with a narrower beam width and a higher beam gain. In some aspects, a first beam of the plurality of beams is associated with the first level and a second beam of the plurality of beam is associated with the second level.

In a third aspect, alone or in combination with one or more of the first and second aspects, the two or more levels of beams include three levels of beams.

In a fourth aspect, alone or in combination with one or more of the first through third aspects, a first beam of the plurality of beams and a second beam of the plurality of beams are associated with a parent-child relationship.

In a fifth aspect, alone or in combination with one or more of the first through fourth aspects, the UE includes an antenna subarray that includes at least two antennas of the plurality of antennas, wherein the codebook is associated with an odd number of beams for the antenna subarray.

In a sixth aspect, alone or in combination with one or more of the first through fifth aspects, each subarray of the UE is associated with an odd number of beams.

In a seventh aspect, alone or in combination with one or more of the first through sixth aspects, each subarray of the UE and each level of beams is associated with a same number of beams per multiple-input multiple-output layer.

In an eighth aspect, alone or in combination with one or more of the first through seventh aspects, the parameters for beam generation are configured parameters that are based at least in part on characteristics of the UE.

In a ninth aspect, alone or in combination with one or more of the first through eighth aspects, the characteristics of the UE include at least one of: a number of the plurality of antennas of the UE, a geometry of the plurality of antennas, a radio frequency chain configuration of the UE, or an antenna module configuration of the UE.

In a tenth aspect, alone or in combination with one or more of the first through ninth aspects, the configured parameters include at least one of: an amplitude associated with an antenna of the plurality of antennas or the beam, a phase associated with the antenna or the beam, a parent-child relationship between two or more beams of the plurality of beams, a beam pair relationship between the two or more beams, or a polarity associated with the antenna or a beam of the plurality of beams.

In an eleventh aspect, alone or in combination with one or more of the first through tenth aspects, the UE may generate the plurality of beams using a respective codeword of a plurality of codewords identified by the codebook, wherein a codeword corresponding to the beam indicates that the one or more first antennas are to be active during generation of the beam and that the one or more second antennas are not to be active during generation of the beam.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method performed by a device, comprising:
receiving electric field information regarding a plurality of beams generated by a plurality of antennas of a wireless communication device, wherein the electric field information is based on a per-antenna measurement procedure;

generating a codebook based at least in part on the electric field information,
wherein the electric field information includes magnitude information and phase information for a single antenna of the plurality of antennas of the wireless communication device,
wherein the codebook identifies codewords corresponding to the plurality of beams, and
wherein the codebook identifies beam pairs to be used for communication by the wireless communication device; and
providing information identifying the codebook.

2. The method of claim 1, wherein the codebook is further based on trace delay information associated with the plurality of antennas.

3. The method of claim 1, further comprising:
receiving hardware information relating to a testing device used to collect the electric field information, wherein the hardware information identifies, for an antenna of the plurality of antennas, at least one of:
a modem chain,
a radio frequency chain,
a polarity, or
an antenna pin mapping.

4. The method of claim 3, further comprising:
receiving subarray information for the plurality of antennas, wherein the subarray information identifies one or more subarrays used to generate the plurality of beams, and wherein the codebook is based at least in part on the subarray information.

5. The method of claim 1, further comprising:
determining whether a beam, generated by the wireless communication device using the codebook, matches an expected beam defined by the codebook.

6. The method of claim 5, wherein determining whether the beam matches the expected beam is based at least in part on a per-beam measurement of phase or amplitude.

7. The method of claim 5, wherein determining whether the beam matches the expected beam is based at least in part on a spherical cumulative distribution function of beam power.

8. A method performed by a device, comprising:
receiving electric field information regarding a plurality of beams generated by a plurality of antennas of a wireless communication device, wherein the electric field information is based on a per-antenna measurement procedure;
receiving information identifying a mount orientation of the wireless communication device, wherein the mount orientation indicates an orientation of a coordinate system of the wireless communication device relative to a coordinate system of a positioner;
generating a codebook based at least in part on the electric field information, and
wherein the codebook identifies codewords corresponding to the plurality of beams,
wherein the codebook identifies beam pairs to be used for communication by the wireless communication device, and
wherein the codebook is based at least in part on the mount orientation; and
providing information identifying the codebook.

9. A method of wireless communication performed by a user equipment (UE), comprising:
loading a codebook,
wherein the codebook indicates parameters for beam generation for communication by the UE using a plurality of antennas of the UE,
wherein the codebook is based at least in part on measurement information gathered using a per-antenna measurement procedure, and
wherein the measurement information includes magnitude information and phase information for a single antenna of the plurality of antennas of the UE; and
generating a plurality of beams based at least in part on the codebook,
wherein one or more first antennas of the UE are active during generation of a beam of the plurality of beams, and
wherein one or more second antennas of the UE are not active during generation of the beam.

10. The method of claim 9, wherein the one or more first antennas and the one or more second antennas are part of a same antenna subarray or a same antenna module.

11. A method of wireless communication performed by a user equipment (UE), comprising:
loading a codebook,
wherein the codebook indicates parameters for beam generation for communication by the UE using a plurality of antennas of the UE,
wherein the codebook is based at least in part on measurement information gathered using a per-antenna measurement procedure,
wherein the parameters for beam generation relate to two or more levels of beams,
wherein a first level, of the two or more levels, is associated with a wider beam width and a lower beam gain, and
wherein a second level, of the two or more levels, is associated with a narrower beam width and a higher beam gain; and
generating a plurality of beams based at least in part on the codebook,
wherein a first beam of the plurality of beams is associated with the first level, and
wherein a second beam of the plurality of beams is associated with the second level.

12. The method of claim 11, wherein the two or more levels of beams include three levels of beams.

13. The method of claim 9, wherein a first beam of the plurality of beams and a second beam of the plurality of beams are associated with a parent-child relationship.

14. The method of claim 9, wherein the UE includes an antenna subarray that includes at least two antennas of the plurality of antennas, and
wherein the codebook is associated with an odd number of beams for the antenna subarray.

15. The method of claim 14, wherein each subarray of the UE is associated with an odd number of beams.

16. The method of claim 9, wherein each subarray, of subarrays of the UE, is associated with a same number of beams per multiple-input multiple-output layer.

17. The method of claim 9, wherein the parameters for beam generation are configured parameters that are based at least in part on characteristics of the UE.

18. The method of claim 17, wherein the characteristics of the UE include at least one of:
a number of the plurality of antennas of the UE,
a geometry of the plurality of antennas,
a radio frequency chain configuration of the UE, or
an antenna module configuration of the UE.

19. The method of claim 17, wherein the configured parameters include at least one of:
an amplitude associated with an antenna of the plurality of antennas or the beam,
a phase associated with the antenna or the beam,
a parent-child relationship between two or more beams of the plurality of beams,
a beam pair relationship between at least two beams of the plurality of beams, or
a polarity associated with the antenna or a beam of the plurality of beams.

20. The method of claim 9, wherein generating the plurality of beams based at least in part on the codebook further comprises:
generating the plurality of beams using a respective codeword of a plurality of codewords identified by the codebook,
wherein a codeword corresponding to the beam indicates that the one or more first antennas are to be active during generation of the beam and that the one or more second antennas are not to be active during generation of the beam.

21. A device for wireless communication, comprising:
a memory; and
one or more processors, coupled to the memory, configured to:
receive electric field information regarding a plurality of beams generated by a plurality of antennas of a wireless communication device, wherein the electric field information is based on a per-antenna measurement procedure;
generate a codebook based at least in part on the electric field information,
wherein the electric field information includes magnitude information and phase information for a single antenna of the plurality of antennas of the wireless communication device,
wherein the codebook identifies codewords corresponding to the plurality of beams, and
wherein the codebook identifies beam pairs to be used for communication by the wireless communication device; and
provide information identifying the codebook.

22. A user equipment (UE) for wireless communication, comprising:
a memory; and
one or more processors, coupled to the memory, configured to:
load a codebook,
wherein the codebook indicates parameters for beam generation for communication by the UE using a plurality of antennas of the UE,
wherein the codebook is based at least in part on measurement information gathered using a per-antenna measurement procedure, and
wherein the measurement information includes magnitude information and phase information for a single antenna of the plurality of antennas of the UE; and
generate a plurality of beams based at least in part on the codebook,
wherein one or more first antennas of the UE are active during generation of a beam of the plurality of beams, and
wherein one or more second antennas of the UE are not active during generation of the beam.

23. The UE of claim 22, wherein the one or more first antennas and the one or more second antennas are part of a same antenna subarray or a same antenna module.

24. A user equipment (UE) for wireless communication, comprising:
a memory; and
one or more processors, coupled to the memory, configured to:
load a codebook,
wherein the codebook indicates parameters for beam generation for communication by the UE using a plurality of antennas of the UE,
wherein the codebook is based at least in part on measurement information gathered using a per-antenna measurement procedure,
wherein the parameters for beam generation relate to two or more levels of beams,
wherein a first level, of the two or more levels, is associated with a wider beam width and a lower beam gain, and
wherein a second level, of the two or more levels, is associated with a narrower beam width and a higher beam gain; and
generate a plurality of beams based at least in part on the codebook,
wherein a first beam of the plurality of beams is associated with the first level, and
wherein a second beam of the plurality of beams is associated with the second level.

25. The UE of claim 22, wherein a first beam of the plurality of beams and a second beam of the plurality of beams are associated with a parent-child relationship.

26. The method of claim 1, wherein the communication is dual-port communication.

27. The device of claim 21, wherein the communication is dual-port communication.

28. The method of claim 1, wherein the electric field information includes the phase information.

29. The method of claim 8, wherein the electric field information includes phase information for a single antenna of the plurality of antennas.

30. The method of claim 9, wherein the measurement information includes the phase information.

31. The method of claim 11, wherein the measurement information includes phase information for a single antenna of the plurality of antennas.

32. The device of claim 21, wherein the electric field information includes the phase information.

33. The UE of claim 22, wherein the measurement information includes the phase information.

34. The UE of claim 24, wherein the measurement information includes phase information for a single antenna of the plurality of antennas.

35. A device for wireless communication, comprising:
a memory; and
one or more processors, coupled to the memory, configured to:
receive electric field information regarding a plurality of beams generated by a plurality of antennas of a wireless communication device, wherein the electric field information is based on a per-antenna measurement procedure;
receive information identifying a mount orientation of the wireless communication device, wherein the mount orientation indicates an orientation of a coordinate system of the wireless communication device relative to a coordinate system of a positioner;

generate a codebook based at least in part on the electric field information, and
- wherein the codebook identifies codewords corresponding to the plurality of beams,
- wherein the codebook identifies beam pairs to be used for communication by the wireless communication device, and
- wherein the codebook is based at least in part on the mount orientation; and provide information identifying the codebook.

36. The device of claim 35, wherein the electric field information includes phase information for a single antenna of the plurality of antennas.

* * * * *